US010873691B2

(12) United States Patent
Sugita

(10) Patent No.: US 10,873,691 B2
(45) Date of Patent: Dec. 22, 2020

(54) ACCESSORY APPARATUS AND IMAGING APPARATUS

(71) Applicant: CANON KABUSHIKI KAISHA, Tokyo (JP)

(72) Inventor: Atsushi Sugita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/992,356

(22) Filed: May 30, 2018

(65) Prior Publication Data
US 2018/0352139 A1    Dec. 6, 2018

(30) Foreign Application Priority Data

May 31, 2017 (JP) .................................. 2017-107961
May 21, 2018 (JP) .................................. 2018-096870

(51) Int. Cl.
*H04N 5/225* (2006.01)
*H04N 5/232* (2006.01)
(Continued)

(52) U.S. Cl.
CPC ......... *H04N 5/23209* (2013.01); *G03B 17/14* (2013.01); *G03B 17/18* (2013.01); *H04N 5/23203* (2013.01)

(58) Field of Classification Search
None
See application file for complete search history.

(56) References Cited

U.S. PATENT DOCUMENTS 5,877,811 A * 3/1999 Iijima ................ H04N 5/23209
348/220.1
2005/0158044 A1    7/2005 Ide
(Continued)

FOREIGN PATENT DOCUMENTS

CN    102375303 A    3/2012
CN    102890392 A    1/2013
(Continued)

OTHER PUBLICATIONS

The above patent documents were cited in a European Search Report dated Oct. 15, 2018, which is enclosed, that issued in the corresponding European Patent Application No. 18175175.1.
(Continued)

*Primary Examiner* — Twyler L Haskins
*Assistant Examiner* — Dwight Alex C Tejano
(74) *Attorney, Agent, or Firm* — Cowan, Liebowitz & Latman, P.C.

(57) ABSTRACT

An accessory apparatus is connectable to an imaging apparatus along with an interchangeable lens apparatus. The accessory apparatus includes an accessory communication unit configured to provide a communication channel to and from the imaging apparatus, an operation member allowing an operation by a user, and an accessory control unit configured to communicate with the imaging apparatus via the accessory communication unit. The accessory control unit notifies the imaging apparatus of a communication request according to detection of the operation of the operation member, and repeats transmitting operation state information indicating an operation state of the operation member to the imaging apparatus from when the communication request is notified to when an end of the operation is detected.

31 Claims, 19 Drawing Sheets

(51) Int. Cl.
*G03B 17/14* (2006.01)
*G03B 17/18* (2006.01)

(56) References Cited

U.S. PATENT DOCUMENTS

| | | | |
|---|---|---|---|
| 2012/0033955 A1* | 2/2012 | Okada | G02B 7/14 |
| | | | 396/71 |
| 2012/0044407 A1 | 2/2012 | Murashima | |
| 2012/0099004 A1 | 4/2012 | Shibuno | |
| 2013/0022348 A1* | 1/2013 | Hasuda | G03B 17/14 |
| | | | 396/530 |
| 2013/0028590 A1 | 1/2013 | Hasuda | |
| 2013/0051780 A1 | 2/2013 | Takahata | |
| 2013/0141609 A1 | 6/2013 | Watazawa | |
| 2014/0184893 A1 | 7/2014 | Imafuji | |
| 2016/0037050 A1* | 2/2016 | Irie | H04N 5/23209 |
| | | | 348/207.1 |
| 2017/0192209 A1* | 7/2017 | Yamahiro | G02B 13/26 |
| 2018/0224720 A1* | 8/2018 | Pan | H04N 5/232 |
| 2018/0348475 A1* | 12/2018 | Sugiyama | G03B 7/20 |

FOREIGN PATENT DOCUMENTS

| | | |
|---|---|---|
| CN | 105446060 A | 3/2016 |
| JP | 2006-171392 A | 6/2006 |
| JP | 2007-017746 A | 1/2007 |
| JP | 2013-097352 A | 5/2013 |
| WO | 2017/068912 A1 | 4/2017 |

OTHER PUBLICATIONS

The above patent document was cited in a European Office Action dated Jun. 4, 2020, which is enclosed, that issued in the corresponding European Patent Application No. 18175175.1.

The above foreign patent document 1 was cited in a Jul. 7, 2020 Japanese Office Action, which is enclosed with an English Translation, that issued in Japanese Patent Application No. 2018096870.

The above foreign patent documents 2, 3, 4 and 5 were cited in a Jun. 17, 2020 Chinese Office Action, which is enclosed with an English Translation, that issued in Chinese Patent Application No. 201810540052.6.

* cited by examiner

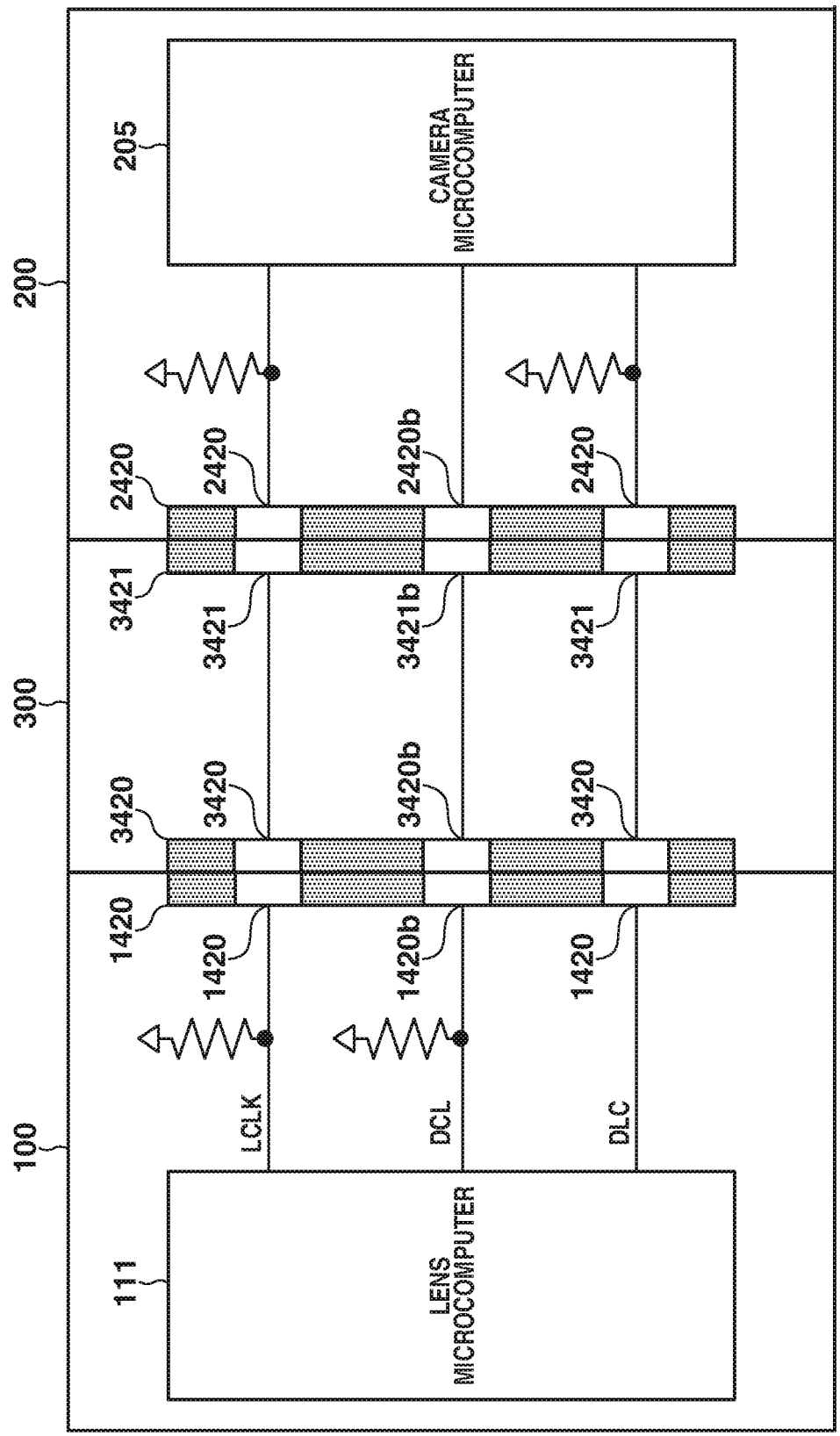

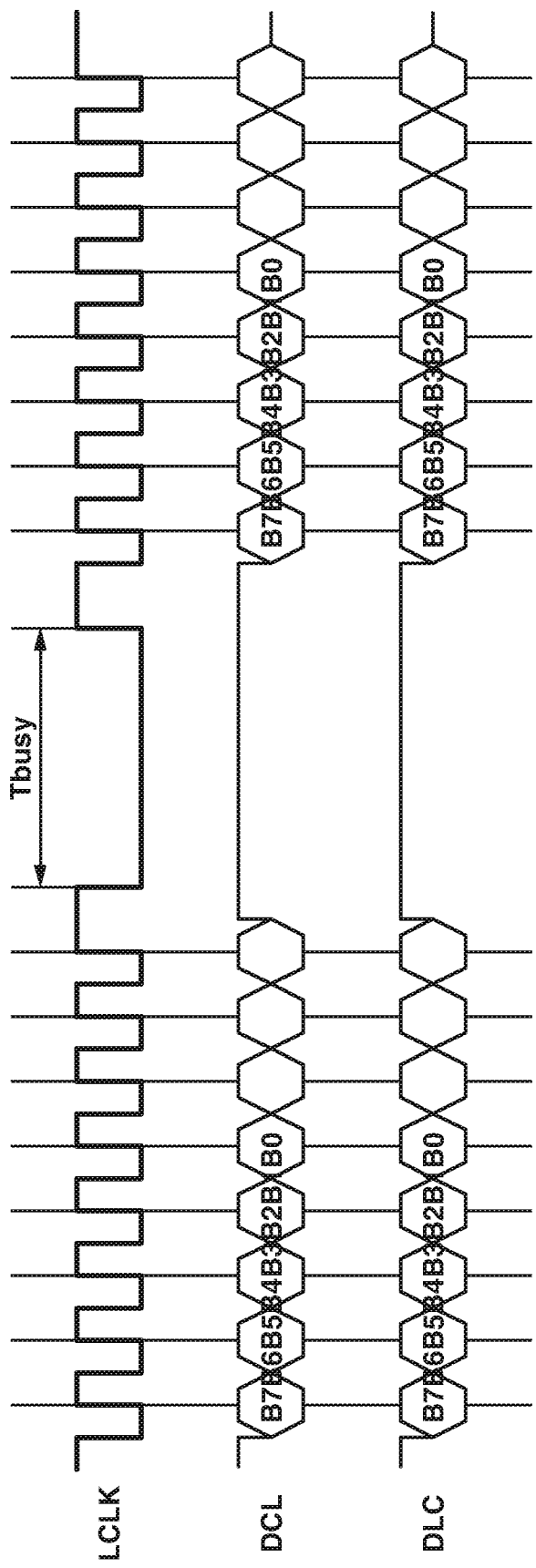

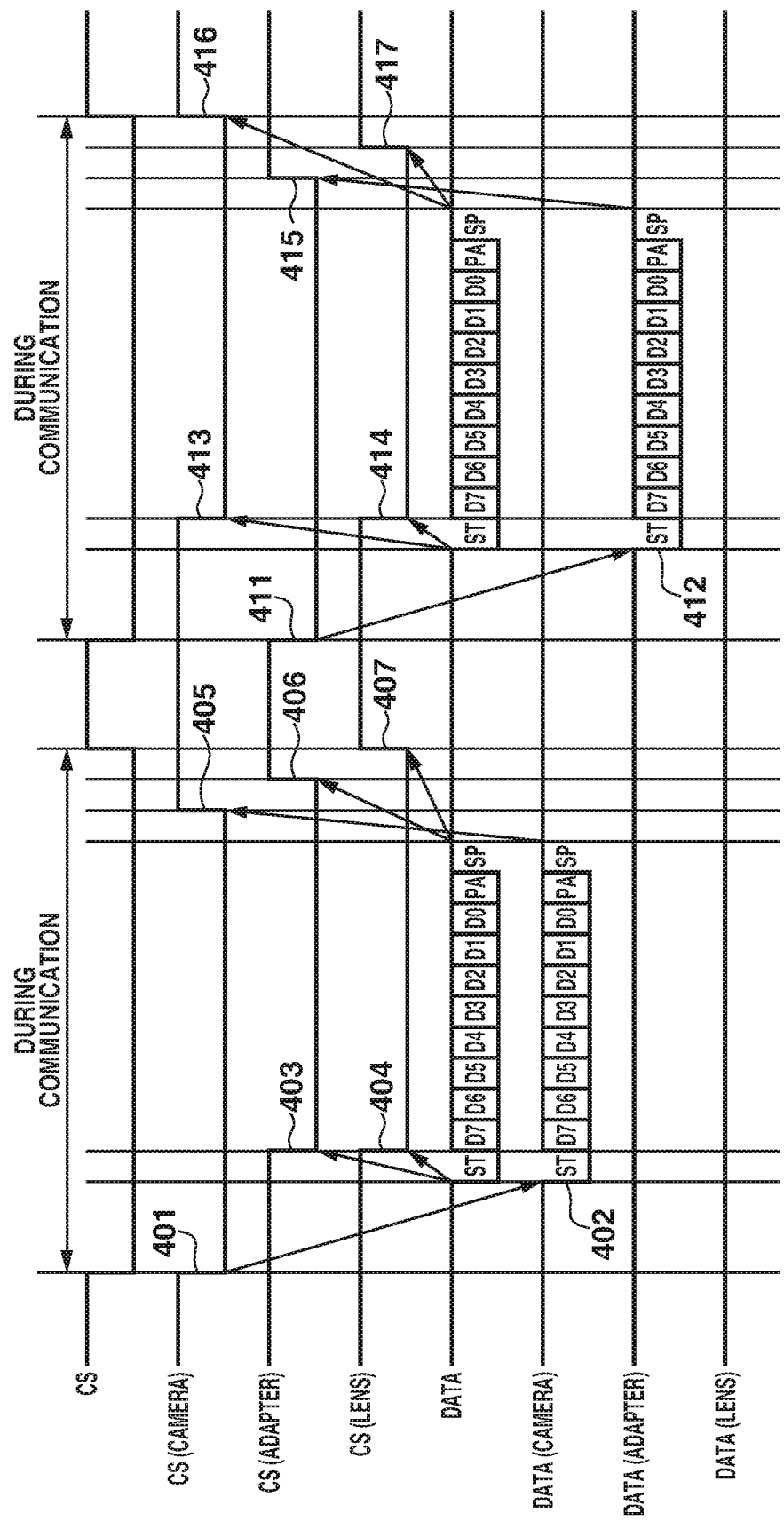

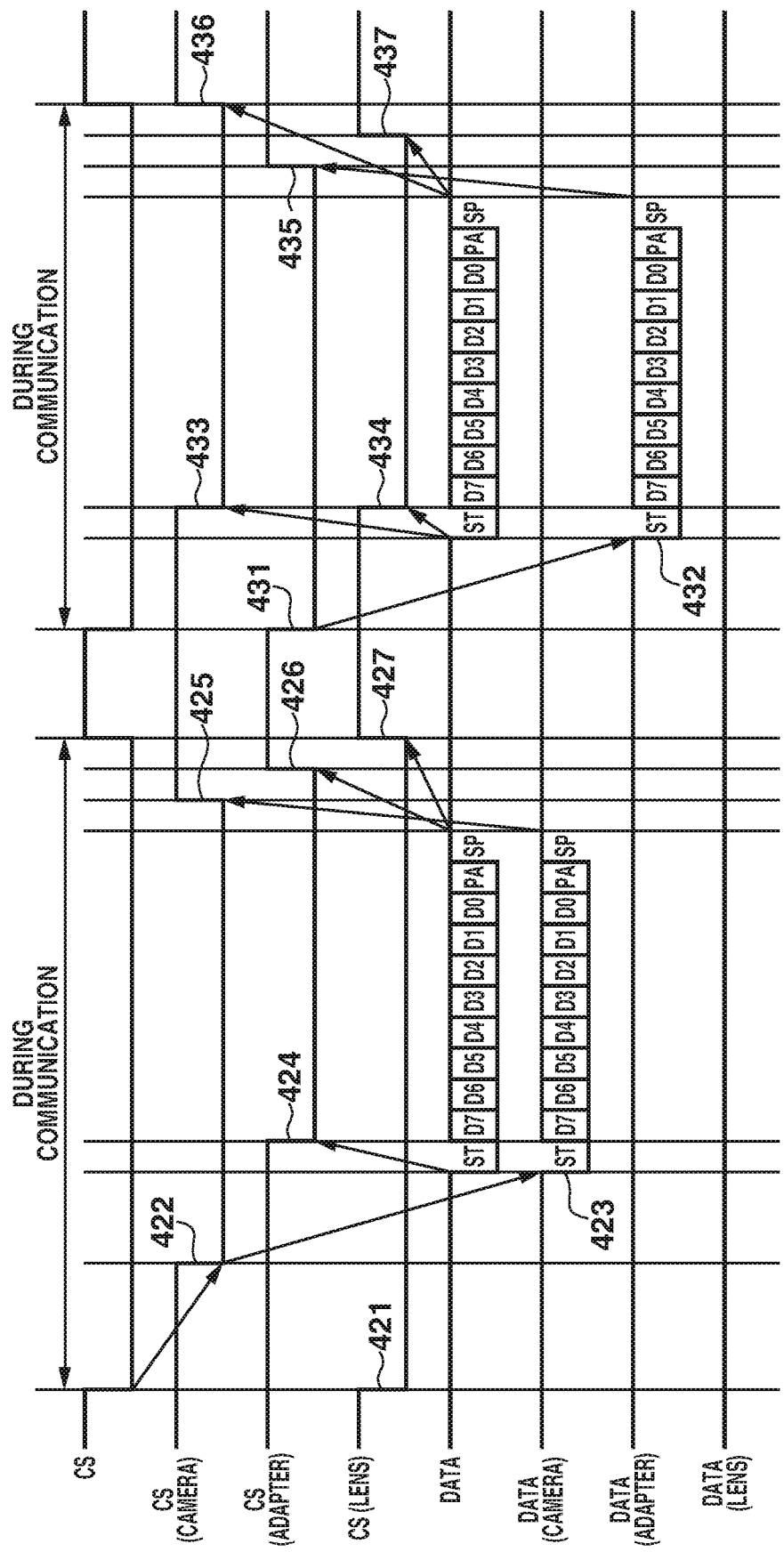

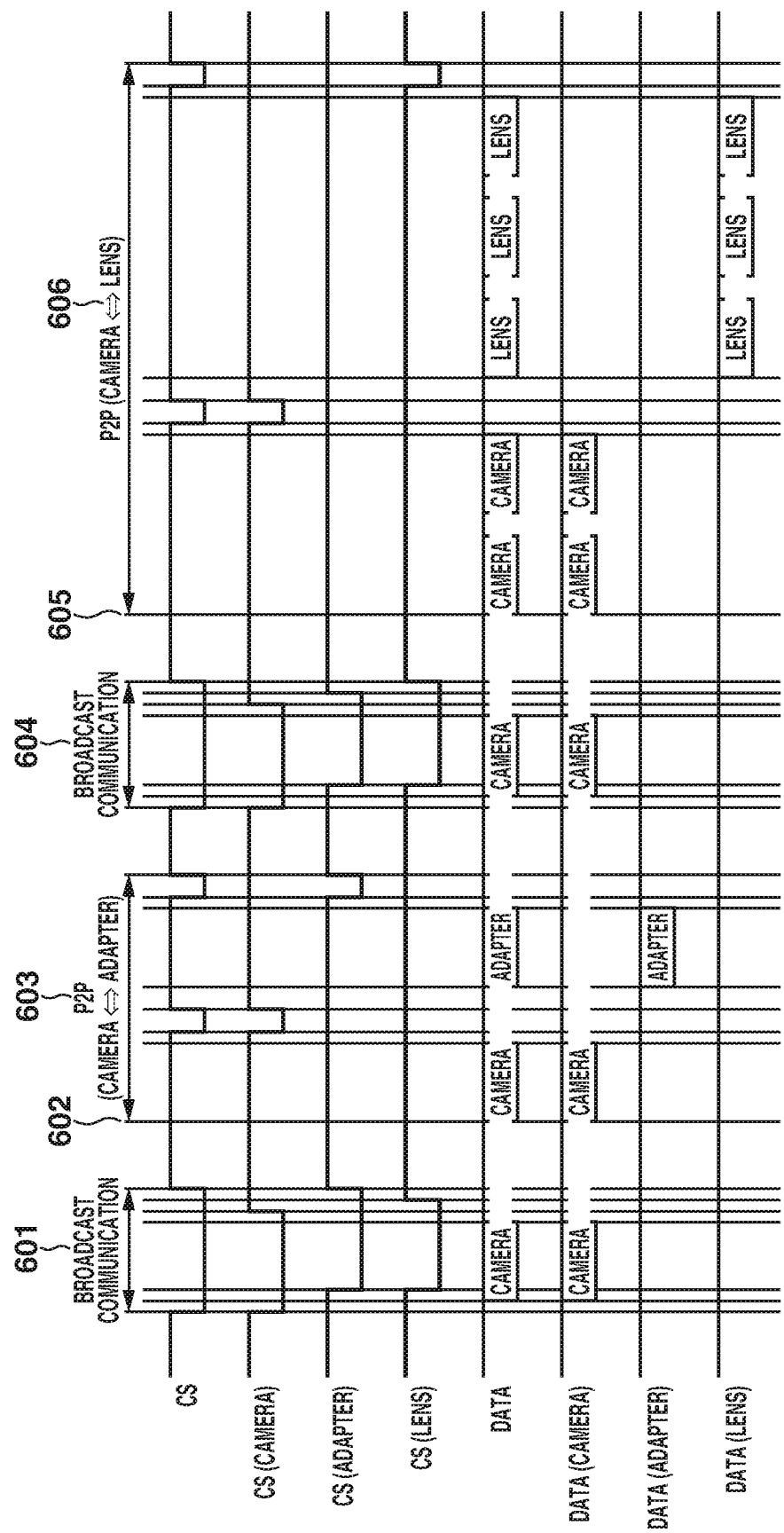

ACCESSORY APPARATUS AND IMAGING APPARATUS

BACKGROUND OF THE INVENTION

Field of the Disclosure

The present disclosure relates to an imaging (camera) system including an imaging apparatus (hereinafter, referred to as a camera main body) and an interchangeable lens apparatus (hereinafter, referred to as an interchangeable lens) which can communicate with each other, and an accessory apparatus such as an adapter apparatus (hereinafter, referred to as an adapter) which is arranged between the camera main body and the lens.

Description of the Related Art

In an interchangeable lens camera system, a camera main body and an interchangeable lens transmit and receive data to/from each other via a communication system. To implement imaging processing and image recording of high image quality and responsiveness, and smooth imaging controls including an aperture control and a focus control, large capacity and highly real-time data communication needs to be performed.

An adapter, such as a wide converter and a teleconverter (extender), may be mounted between the camera main body and the interchangeable lens. The adapter may include an operation member allowing a user to operate for performing a lens control, such as an aperture control and a focus control. Like the interchangeable lens, such an adapter also needs to communicate with the camera main body. The camera system therefore needs a communication system in which the camera main body can perform one-to-many communication with the interchangeable lens and the adapter to allow highly real-time data communication (i.e., imaging control).

Japanese Patent Application Laid-Open No. 2006-171392 discusses a camera system which corrects a change in optical parameters due to an adapter if the adapter is mounted between a camera main body and an interchangeable lens. Japanese Patent Application Laid-Open No. 2013-097352 discusses a camera system in which a camera main body is allowed to associate an arbitrary function with an operation member provided on an interchangeable lens.

In both the camera systems discussed in Japanese Patent Application Laid-Open Nos. 2006-171392 and 2013-097352, the camera main body and the interchangeable lens only perform one-to-one communication therebetween. If the adapter includes an operation member, highly real-time imaging control is therefore difficult to be implemented. In the camera system discussed in Japanese Patent Application Laid-Open No. 2013-097352, the camera main body constantly monitors operation information about the operation member of the interchangeable lens. If constant monitoring of the adapter is added thereto, a communication wait can occur easily, impairing the real-timeness of the data communication.

SUMMARY OF THE INVENTION

The present disclosure is directed to providing a camera system which allows one-to-many communication of a camera main body with an interchangeable lens and an accessory apparatus such as an adapter, so that highly real-time imaging control can be performed by using an operation member provided on the accessory apparatus.

According to an aspect of the present disclosure, an accessory apparatus is connectable to an imaging apparatus. The accessory apparatus includes an accessory communication unit configured to provide a communication channel to and from the imaging apparatus, an operation member allowing an operation by a user, and an accessory control unit configured to communicate with the imaging apparatus via the accessory communication unit. The accessory communication unit notifies the imaging apparatus of a communication request according to detection of the operation of the operation member, and repeats transmitting operation state information indicating an operation state of the operation member to the imaging apparatus from when the communication request is notified to when an end of the operation is detected.

According to another aspect of the present disclosure, an imaging apparatus is one to which an accessory apparatus including an operation member allowing an operation by a user is connectable. The imaging apparatus includes a camera communication unit configured to provide a communication channel to and from the accessory apparatus, and a camera control unit configured to communicate with the accessory apparatus via the camera control unit. The camera control unit receives a communication request notified by the accessory apparatus according to detection of the operation of the operation member, and repeats requesting operation state information indicating an operation state of the operation member from the accessory apparatus from when the communication request is received to when operation end information indicating an end of the operation is received.

An imaging system including the foregoing accessory apparatus, an interchangeable lens apparatus, and the imaging apparatus also constitutes another aspect of the present disclosure.

According to yet another aspect of the present disclosure, a communication control method is applied to an accessory apparatus connectable to an image apparatus, the accessory apparatus providing a communication channel to and from the imaging apparatus and including an operation unit allowing an operation by a user. The communication control method includes causing the accessory apparatus to notify the imaging apparatus of a communication request according to detection of the operation of the operation member, and causing the accessory apparatus to repeat transmitting operation state information indicating an operation state of the operation member to the imaging apparatus from when the communication request is notified to when an end of the operation is detected.

According to yet another aspect of the present disclosure, a communication control method is applied to an imaging apparatus to which an accessory apparatus including an operation member allowing an operation by a user is connectable and which provides a communication channel to and from the accessory apparatus. The communication control method includes causing the imaging apparatus to receive a communication request notified by the accessory apparatus according to detection of the operation of the operation unit, and causing the imaging apparatus to repeat requesting operation state information indicating an operation state of the operation member from the accessory apparatus from when the communication request is received to when operation end information indicating an end of the operation is received from the accessory apparatus.

A communication control program serving as a computer program for causing a computer of an accessory apparatus or an imaging apparatus to perform processing according to the foregoing communication control methods also constitutes an aspect of the present disclosure.

Further features of the present disclosure will become apparent from the following description of exemplary embodiments with reference to the attached drawings.

BRIEF DESCRIPTION OF THE DRAWINGS

FIG. 2B is a diagram illustrating a communication pass for second communication between a camera main body (camera microcomputer), an interchangeable lens (lens microcomputer), and an adapter (adapter microcomputer) according to one or more aspects of the present disclosure. FIG. 2C is a diagram illustrating communication waveforms in the second communication according to one or more aspects of the present disclosure.

FIG. 4A is a diagram illustrating communication waveforms in broadcast communication according to one or more aspects of the present disclosure. FIG. 4B is another diagram illustrating communication waveforms in broadcast communication according to one or more aspects of the present disclosure.

FIG. 6 is a diagram illustrating communication waveforms during switching of communication modes according to one or more aspects of the present disclosure.

DESCRIPTION OF THE EMBODIMENTS

Exemplary embodiments of the present disclosure will be described below with reference to the drawings.

Figure 1:
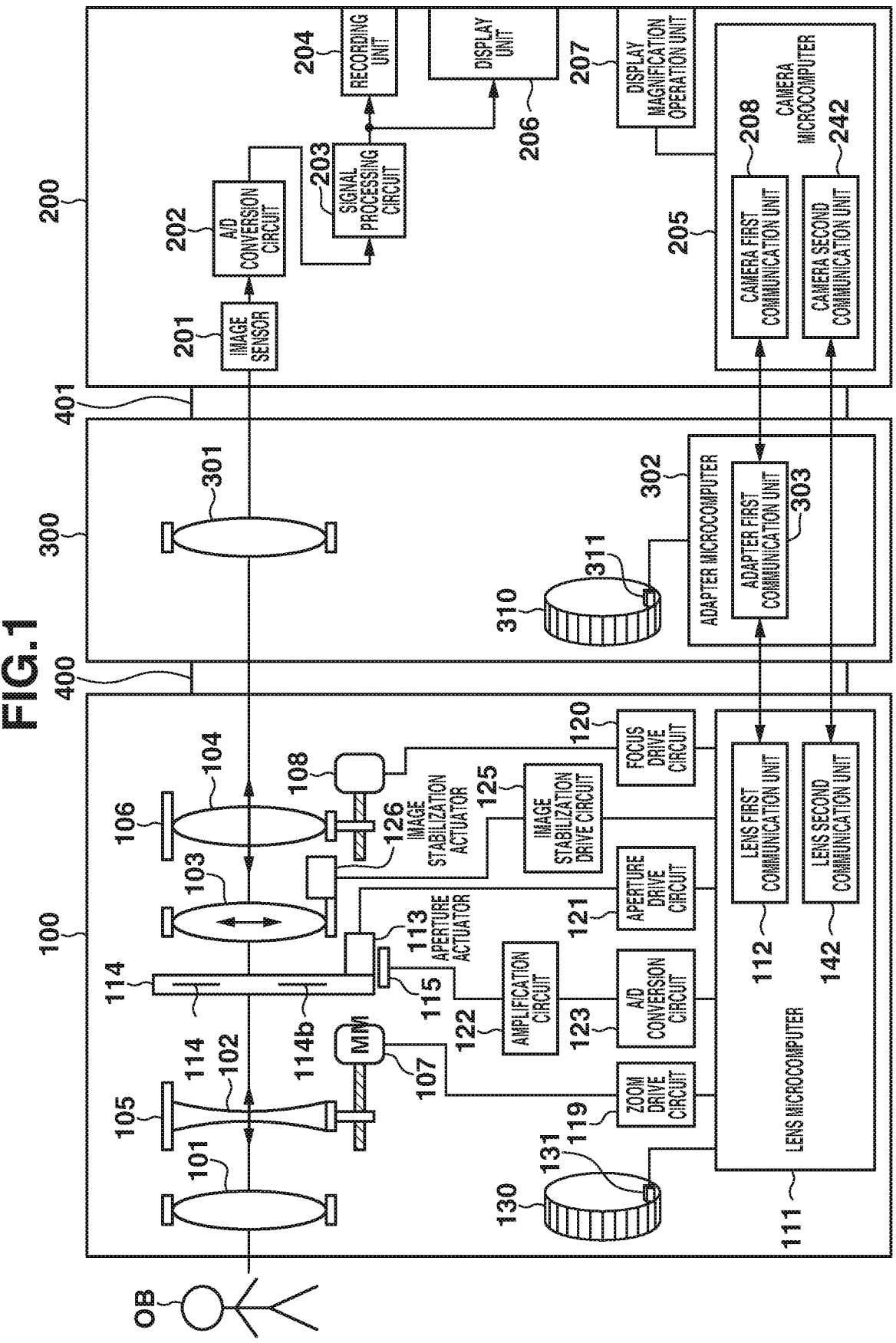
FIG. 1 is a block diagram illustrating a configuration of a camera system according to one or more aspects of the present disclosure.

FIG. 1 illustrates a configuration of an imaging system (hereinafter, referred to as a camera system) including an imaging apparatus (hereinafter, referred to as a camera main body) 200 which is a first exemplary embodiment of the present disclosure, an interchangeable lens 100, and an adapter apparatus (hereinafter, referred to simply as an adapter) 300 which serves as an intermediate accessory apparatus. The camera main body 200 according to the present exemplary embodiment can be used in a state where both the interchangeable lens 100 and the adapter 300 are mounted.

As an example, FIG. 1 illustrates a camera system in which one adapter 300 is mounted between the camera main body 200 and the interchangeable lens 100. A plurality of adapters can be coupled and mounted between the camera main body 200 and the interchangeable lens 100.

In the camera system according to the present exemplary embodiment, the camera main body 200, the interchangeable lens 100, and the adapter 300 communicate with each other by using a plurality of communication methods. The camera main body 200, the interchangeable lens 100, and the adapter 300 transmit control commands and data (information) via respective first communication units. The first communication units support a plurality of communication methods each, and can select optimum communication methods for various situations by switching to the same communication methods in synchronization with each other according to the type of data to be communicated and the purpose of communication.

The camera system according to the present exemplary embodiment includes a channel for performing communication via second communication units of the camera main body 200 and the interchangeable lens 100, aside from the channel for performing communication via the respective first communication units of the camera main body 200, the interchangeable lens 100, and the adapter 300.

A more specific configuration of the interchangeable lens 100, the camera main body 200, and the adapter 300 will initially be described.

The interchangeable lens 100 and the adapter 300 are mechanically and electrically connected via a mount 400 which is a coupling mechanism. Similarly, the adapter 300 and the camera main body 200 are mechanically and electrically connected via a mount 401 which is a coupling mechanism. The interchangeable lens 100 and the adapter 300 obtain power supply from the camera main body 200 via power supply terminal units (not illustrated) provided on the mounts 400 and 401. Power needed for the operation of various actuators to be described below, a lens microcomputer 111, and an adapter microcomputer 302 is thus supplied. The interchangeable lens 100, the camera main body 200, and the adapter 300 communicate with each other via communication terminal units (not illustrated) provided on the mounts 400 and 401.

The interchangeable lens 100 includes an imaging optical system. The imaging optical system includes a field lens 101, a magnification lens 102, and an aperture unit 114 in order from an object OBJ side. The magnification lens 102 provides magnification. The aperture unit 114 adjusts the amount of light. The imaging optical system further includes an image stabilization lens 103 which reduces (corrects) image vibrations, and a focus lens 104 which performs focus adjustment.

The magnification lens 102 and the focus lens 104 are held by lens holding frames 105 and 106, respectively. The lens holding frames 105 and 106 are guided to be movable in an optical axis direction (illustrated by a broken line in the diagram) by a not-illustrated guide shaft, and driven in the optical axis direction by stepping motors 107 and 108. The stepping motors 107 and 108 move the magnification lens 102 and the focus lens 104, respectively, in synchronization with drive pulses.

The image stabilization lens 103 reduces image vibrations due to camera shakes by shifting in directions orthogonal to the optical axis of the imaging optical system.

The lens microcomputer 111 is a lens control unit which controls the operation of various parts in the interchangeable lens 100. The lens microcomputer 111 receives control commands and transmission request commands transmitted from the camera main body 200 via a lens first communication unit 112 which includes a lens communication interface circuit. The lens microcomputer 111 performs lens control corresponding to the control commands, and transmits lens data corresponding to the transmission request commands to the camera main body 200 via the lens first communication unit 112.

The lens microcomputer 111 outputs drive signals to a zoom drive circuit 119 and a focus drive circuit 120 to drive the stepping motors 107 and 108 in response to magnification- and focusing-related commands among the control commands. The lens microcomputer 111 thereby performs zoom processing for controlling a magnification operation of the magnification lens 102 and autofocus (AF) processing for controlling a focus adjustment operation of the focus lens 104.

The aperture unit 114 includes aperture blades 114*a* and 114*b*. The states (positions) of the aperture blades 114*a* and 114*b* are detected by a Hall element 115. An output from the Hall element 115 is input to the lens microcomputer 111 via an amplification circuit 122 and an analog-to-digital (A/D) conversion circuit 123. The lens microcomputer 111 outputs a drive signal to an aperture drive circuit 121 to drive an aperture actuator 113 based on the signal input from the A/D conversion circuit 123. A light amount adjustment operation of the aperture unit 114 is thereby controlled.

The lens microcomputer 111 further drives an image stabilization actuator (for example, voice coil motor) 126 via an image stabilization drive circuit 125 according to camera shakes detected by a vibration sensor (not illustrated), such as a vibration gyro provided inside the interchangeable lens 100. Image stabilization processing for controlling a shift operation (image stabilization operation) of the image stabilization lens 103 is thereby performed.

The interchangeable lens 100 further includes a manual operation ring (electronic ring) 130 which can be operated to rotate by a user, and a ring rotation detector 131. For example, the ring rotation detector 131 includes a photointerrupter which outputs a two-phase signal according to the rotation of the manual operation ring 130. The lens microcomputer 111 can detect the amount (including direction) of rotation operation of the manual operation ring 130 by using the two-phase signal. The lens microcomputer 111 can notify the camera microcomputer 205 of the amount of rotation operation of the manual operation ring 130 via the lens first communication unit 112.

An example of the adapter 300 is an extender for changing a focal length. The adapter 300 includes a magnification lens 301 and an adapter microcomputer 302. The adapter microcomputer 302 is an adapter control unit (accessory control unit, also referred as a communication control unit) which controls the operation of various parts in the adapter 300. The adapter microcomputer 302 receives control commands and transmission request commands transmitted from the camera main body 200 via an adapter first communication unit (accessory communication unit) 303 which includes a communication interface circuit. The adapter microcomputer 302 performs adapter control corresponding to the control commands, and transmits adapter data corresponding to the transmission request commands to the camera main body 200 via the adapter first communication unit 303. In the present exemplary embodiment, the adapter 300 is described to be an extender. The adapter 300 can be a wide converter for changing the focal length, or a mount converter for changing a flange back length.

Like the interchangeable lens 100, the adapter 300 includes an adapter operation ring (electronic ring) 310 serving as an operation member that can be operated to rotate by the user, and a ring rotation detector 311. Like the ring rotation detector 131 of the interchangeable lens 100, the ring rotation detector 311 includes, for example, a photointerrupter which outputs a two-phase signal according to the rotation of the adapter operation ring 310. The adapter microcomputer 302 can detect the amount (including direction) of rotation operation of the adapter operation ring 310 by using the two-phase signal. The adapter microcomputer 302 can notify the camera microcomputer 205 of the amount of rotation operation of the adapter operation ring 310 via the adapter first communication unit 303.

The adapter 300 can include an operation member other than the adapter operation ring 310. Examples include a switch, a button, and a touch panel. The adapter 300 can include a plurality of operation members.

The camera main body 200 includes an image sensor 201, an A/D conversion circuit 202, a signal processing circuit 203, a recording unit 204, a camera microcomputer 205, and a display unit 206. Examples of the image sensor 201 include a charge-coupled device (CCD) sensor and a complementary metal-oxide-semiconductor (CMOS) sensor.

The image sensor 201 photoelectrically converts an object image formed by the imaging optical system in the interchangeable lens 100 and outputs an electrical signal (analog signal). The A/D conversion circuit 202 converts the analog signal from the image sensor 201 into a digital signal. The signal processing circuit 203 performs various types of image processing on the digital signal from the A/D conversion circuit 202 to generate a video signal. The signal processing circuit 203 also generates focus information indicating a contrast state of the object image (focus state of the imaging optical system) and brightness information expressing an exposure state from the video signal. The signal processing circuit 203 outputs the video signal to the display unit 206. The display unit 206 displays the video signal as a live view image which is used to check composition and a focus state.

The camera microcomputer 205 (also referred as a communication control unit) serving as a camera control unit controls the camera main body 200 according to inputs from camera operation members including a not-illustrated imaging instruction switch and various setting switches. The camera microcomputer 205 transmits control commands related to the magnification operation of the magnification lens 102 to the lens microcomputer 111 via a camera first communication unit 208, which includes a communication interface circuit, according to the operation of a not-illustrated zoom switch. The camera microcomputer 205 further transmits control commands related to the light amount adjustment operation of the aperture unit 114 according to the brightness information and the focus adjustment operation of the focus lens 104 according to the focus information to the lens microcomputer 111 via the camera first communication unit 208. The camera microcomputer 205 transmits transmission request commands for obtaining control information and state information about the interchangeable lens 100 to the lens microcomputer 111 according to need. The camera microcomputer 205 further transmits transmission request commands for obtaining control information and state information about the adapter 300 to the adapter microcomputer 302.

Next, a communication pass constructed between the camera main body 200 (camera microcomputer 205), the interchangeable lens 100 (lens microcomputer 111), and the adapter 300 (adapter microcomputer 302) for communication via at least two of a camera first communication unit 208, an adapter first communication unit 303, and a lens first communication unit 112 will be described with reference to FIG. 2A. The communication of this communication pass is referred to as first communication. The camera microcomputer 205, the lens microcomputer 111, and the adapter microcomputer 302 perform communication by using signal lines (channels) connected via the foregoing communication terminal units provided on the mounts 400 and 401.

The signal lines include a signal line (first signal line; corresponding to a signal transmission channel) CS for transmitting a signal for communication control, and a signal line (second signal line; corresponding to a data communication channel) DATA for data communication.

The signal line CS is connected to the camera microcomputer 205, the adapter microcomputer 302, and the lens microcomputer 111. The camera microcomputer 205, the adapter microcomputer 302, and the lens microcomputer 111 can thus detect high and low which are states of the signal line CS. The signal line CS is pull-up connected to a not-illustrated power supply in the camera main body 200. The signal line CS can be connected (open-drain connected) to ground GND via a ground switch 1121 in the interchangeable lens 100, a ground switch 2081 in the camera main body 200, and a ground switch 3031 in the adapter 300.

With such a configuration, the camera microcomputer 205, the adapter microcomputer 302, and the lens microcomputer 111 can set the signal line CS to low by turning on (connecting) the ground switches 2081, 1121, and 3031, respectively. The camera microcomputer 205, the adapter microcomputer 302, and the lens microcomputer 111 can set the signal line CS to high by turning off (disconnecting) the ground switches 2081, 1121, and 3031, respectively. Details of signals for communication control (instructions and notifications) to be transmitted through the signal line CS and output processing thereof will be described below.

The signal line DATA is a single-wired bidirectional data communication line that can be used by switching the transmission direction of data. The signal line DATA can be connected to the lens microcomputer 111 via an input/output changeover switch 1122 in the interchangeable lens 100, and can be connected to the camera microcomputer 205 via an input/output changeover switch 2082 in the camera main body 200. The signal line DATA can also be connected to the adapter microcomputer 302 via an input/output changeover switch 3032 in the adapter 300. The microcomputers 111, 205, and 302 each include a CMOS type data output unit for transmitting data and a CMOS type data input unit for receiving data (neither of which is illustrated). The microcomputers 11, 205, and 302 can select whether to connect the signal line DATA to the data output units or the data input units by switching the respective input/output changeover switches.

In transmitting data, the camera microcomputer 205, the adapter microcomputer 302, and the lens microcomputer 111 each set their input/output changeover switch so that the signal line DATA is connected to the data output unit. In receiving data, the camera microcomputer 205, the adapter microcomputer 302, and the lens microcomputer 111 each set their input/output changeover switch so that the signal line DATA is connected to the data input unit. Details of input/output changeover processing of the signal line DATA will be described below.

Figure 2A:
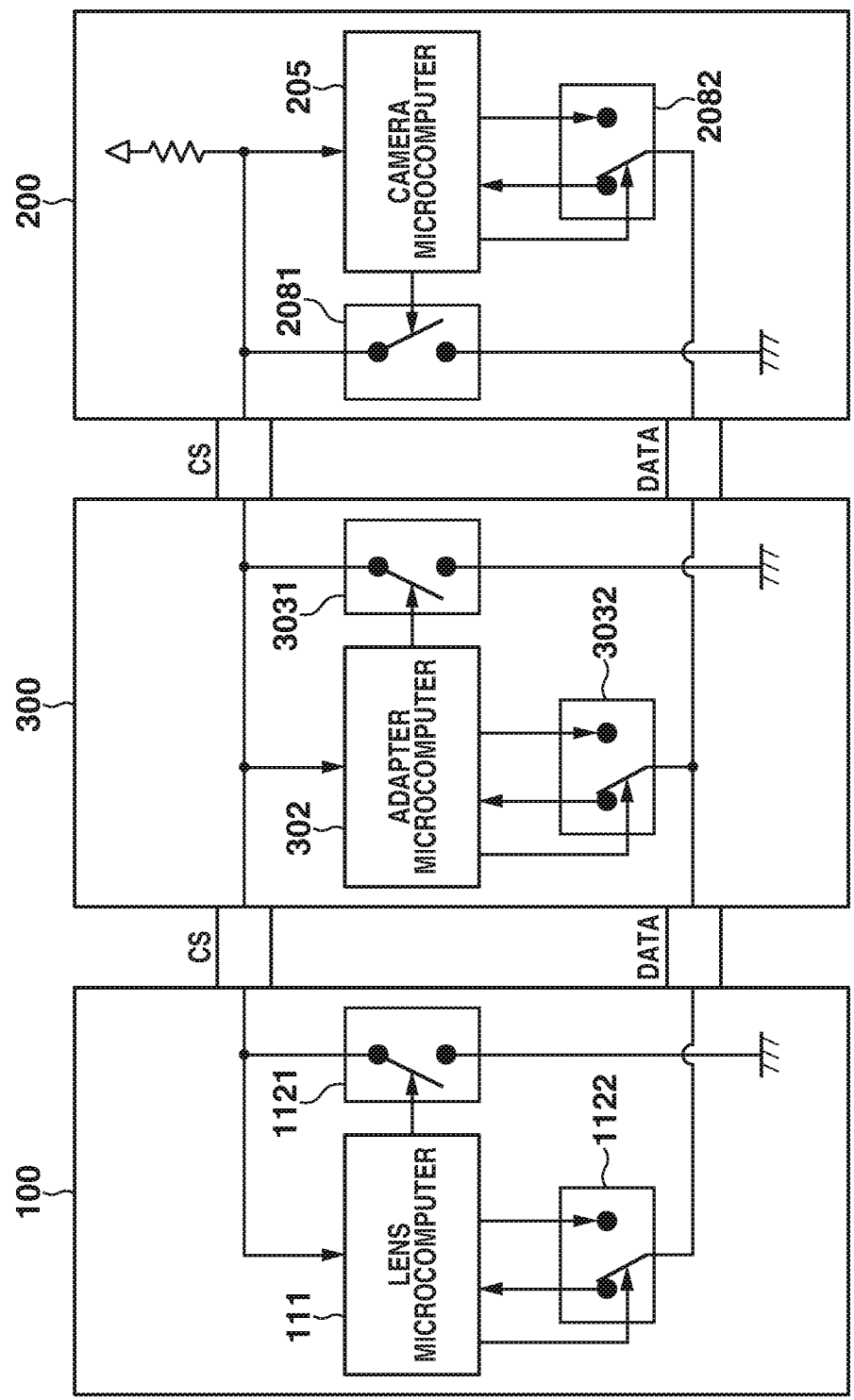
FIG. 2A is a diagram illustrating a communication pass for first communication between a camera main body (camera microcomputer), an interchangeable lens (lens microcomputer), and an adapter (adapter microcomputer) according to one or more aspects of the present disclosure.

While FIG. 2A illustrates an example of the communication circuit, other communication circuits can be used. For example, a communication circuit can be configured so that the signal line CS is pull-down connected to GND in the camera main body 200, and can be connected to a not-illustrated power supply via the ground switch 1121 of the interchangeable lens 100, the ground switch 2081 of the camera main body 200, and the ground switch 3031 of the adapter 300. A communication circuit can be configured so that the signal line DATA is constantly connected to the data input units in the interchangeable lens 100, the camera main body 200, and the adapter 300, and the connection/disconnection between the signal line DATA and the data output units can be switched by using switches.

The communication circuit can include a configuration other than that of the communication circuit illustrated in FIG. 2A as long as broadcast communication and peer-to-peer (P2P) communication to be described below can be performed.

Next, a communication pass constructed between the camera main body 200 (camera microcomputer 205), the interchangeable lens 100 (lens microcomputer 111), and the adapter 300 (adapter microcomputer 302) will be described with reference to FIG. 2B. The communication of this communication pass is referred to as second communication.

Second communication LCLK terminals 1420a, 2420a, 3420a, and 3421a functioning as terminals of a clock line LCLK output from the camera second communication unit 242 which is configured to perform a clock synchronous communication are respectively included in the second communication contact point groups 1420, 2420, 3420, and 3421. In addition, similarly, second communication DCL terminals 1420b, 2420b, 3420b, and 3421b functioning as terminals of a data line DCL output from the camera second communication unit 242 of the clock synchronous communication are included. Furthermore, similarly, second communication DLC terminals 1420c, 2420c, 3420c, and 3421c functioning as terminals of a data line DLC output from the lens second communication unit 142 of the clock synchronous communication are included.

As illustrated in FIG. 2B, the clock line LCLK and the data line DCL are pulled up in the interchangeable lens 10. In addition, the clock line LCLK and the data line DLC are pulled up in the camera main body 100.

The clock line LCLK, the data line DCL, and the data line DLC in the intermediate accessory 300 short-circuited between the second communication contact point groups 3420 and 3421, and the second communication contact point groups 3420 and 3421. In other words, signals communicated via the clock line LCLK, the data line DCL, and the data line DLC just pass through the intermediate accessory 300.

FIG. 2C illustrates waveforms of the clock line LCLK, the data line DCL, and the data line DLC when the second communication is performed. The camera second communication unit 242 on the camera side outputs a clock to the clock line LCLK and also outputs 8-bit data of B7 to B0 to the data line DCL in synchronism with rise of the signal level of the clock line LCLK.

Similarly, the lens second communication unit 142 on the lens side outputs 8-bit data of B7 to B0 to the data line DLC in synchronism with the rising signals of the clock line LCLK. Furthermore, the camera second communication unit 242 on the camera side receives the 8-bit data of B7 to B0 of the data line DLC in synchronism with the rise of the signal level of the clock line LCLK.

Similarly, the lens second communication unit 142 on the lens side receives the 8-bit data of B7 to B0 of the data line DCL in synchronism with the rise of the signal level of the clock line LCLK. With the above-described processing, the camera second communication unit 242 on the camera side and the lens second communication unit 142 on the lens side can mutually exchange the communication data. When the second communication unit 114 on the lens side receives the 8-bit data of B7 to B0 of the data line DCL, the lens second communication unit 142 performs LOW output of the clock line LCLK for a Tbusy time and thereafter cancels the LOW output. Herein, the Tbusy time is a time when the interchangeable lens 10 processes the received data. A configuration is adopted in which, after the data transmission, the camera the camera second communication unit 242 on the camera side does not perform the data transmission until the clock line LCLK changes from LOW to HIGH. With the signal control, it is possible to perform a flow control of the second communication. When the above-described processing is repeated, it is possible to transmit the data between the camera second communication unit 242 on the camera side and the lens second communication unit 142 on the lens side by the second communication.

Herein, the second communication can be realized by the same communication method as the second communication, a bi-directional asynchronous communication method, a master/slave method, a token passing method, or the like.

[Communication Data Format]

Next, the format of communication data exchanged between the camera main body 200 (camera microcomputer 205), the interchangeable lens 100 (lens microcomputer 111), and the adapter 300 (adapter microcomputer 302) will be described with reference to FIG. 3. This communication data format is common to broadcast communication and P2P communication to be described below. The following description deals with a communication data format for the case of performing asynchronous communication in which a communication speed to be used for communication between the microcomputers is determined in advance, and the microcomputers perform transmission and reception at a communication bitrate according to the determination.

Initially, in a non-transmission state in which data transmission is not performed, the signal level is maintained at high. To notify the data reception side of a start of data transmission, the signal level is then set to low for a one-bit period. This one-bit period will be referred to as a start bit ST. Next, one byte of data is transmitted in an eight-bit period from the second to ninth bits. The data has a bit array of most significant bit (MSB)-first format, which starts at most significant data D7, followed by data D6, data D5, . . . , data D1, and ends with least significant data D0. One-bit parity information PA is added at the tenth bit. Finally, the signal level is set to high for the period of a stop bit SP which indicates the end of the transmission data. This ends the one-frame period starting at the start bit ST.

Figure 3:
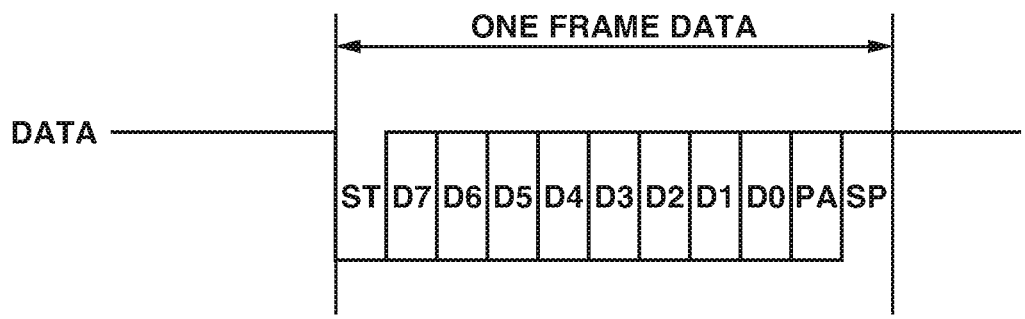
FIG. 3 is a diagram illustrating a communication format according to the first exemplary embodiment.

While FIG. 3 illustrates an example of the communication data format, other communication data formats can be used. For example, the bit array of the data can be in a least significant bit (LSB)-first format, nine bits in length, or without the addition of parity information PA. Communication data formats can be switched between broadcast communication and P2P communication.

[Broadcast Communication]

Next, broadcast communication will be described with reference to FIGS. 4A and 4B. The broadcast communication is one-to-many communication in which one of the camera microcomputer 205, the lens microcomputer 111, and the adapter microcomputer 302 transmits data to the other two at the same time (i.e., simultaneous transmission). Such a broadcast communication is performed by using the signal line CS and the data line DATA. A communication mode in which broadcast communication is performed may be referred to as a broadcast communication mode.

FIG. 4A illustrates signal waveforms in broadcast communication performed between the camera microcomputer 205, the lens microcomputer 111, and the adapter microcomputer 302. For example, a case in which the adapter microcomputer 302 performs broadcast communication to the camera microcomputer 205 and the lens microcomputer 111 in response to broadcast communication from the camera microcomputer 205 to the lens microcomputer 111 and the adapter microcomputer 302 will be described.

In 401, the camera microcomputer 205, which is a communication master, initially starts a low output to the signal line CS to notify the lens microcomputer 111 and the adapter microcomputer 302, which are communication slaves, of a start of broadcast communication. In 402, the camera microcomputer 205 outputs data to be transmitted to the data line DATA.

In 403 and 404, the lens microcomputer 111 and the adapter microcomputer 302 start a low output to the signal line CS at timing when the start bit ST input from the signal line DATA is detected. Since the camera microcomputer 205 has already started the low output to the signal line CS, the signal level of the signal line CS does not change at this point in time.

In 405, the camera microcomputer 205 finishes outputting up to the stop bit SP, and cancels the low output to the signal line CS. The lens microcomputer 111 and the adapter microcomputer 302 receive the data input from the signal line DATA up to the stop bit SP, and then analyze the received data and perform internal processing associated with the received data. In 406 and 407, the lens microcomputer 111 and the adapter microcomputer 302 get ready to receive next data, and then cancel the low output to the signal line CS. As described above, the signal level of the signal line CS becomes high if the camera microcomputer 205, the lens microcomputer 111, and the adapter microcomputer 302 all cancel the low output to the signal line CS. The camera microcomputer 205, the lens microcomputer 111, and the adapter microcomputer 302 can thus each check that the signal level of the signal line CS becomes high after the cancellation of the low output to the signal line CS. By checking that the signal level of the signal line CS becomes high, the camera microcomputer 205, the lens microcomputer 111, and the adapter microcomputer 302 each can determine that the current communication processing is ended and the microcomputers are ready to perform next communication.

In 411, the adapter microcomputer 302 checks that the signal level of the signal line CS has returned to high, and starts a low output to the signal line CS to notify the camera microcomputer 205 and the lens microcomputer 111 of a start of broadcast communication.

In 412, the adapter microcomputer 302 outputs data to be transmitted to the signal line DATA. In 413 and 414, the camera microcomputer 205 and the lens microcomputer 111 start a low output to the signal line CS at timing when the start bit ST input from the signal line DATA is detected. Since the adapter microcomputer 302 has already started the low output to the signal line CS, the signal level propagating the signal line CS does not change at this point in time. In 415, the adapter microcomputer 302 finishes outputting up to the stop bit SP, and cancels the low output to the signal line CS. Meanwhile, the camera microcomputer 205 and the lens microcomputer 111 receive the stop bit SP input from the signal line DATA, and then analyze the received data and perform internal processing associated with the received data. In 416 and 417, the camera microcomputer 205 and the lens microcomputer 111 get ready to receive next data, and then cancel the low output to the signal line CS.

Above explanation can be applied to the case of the lens microcomputer 111 performing broadcast communicating with the camera microcomputer 205 and the adapter microcomputer 302, in reply to the broadcast communication from the camera microcomputer 205 to the lens microcomputer 111 and the adapter microcomputer 302.

That is, after the lens microcomputer 111 outputting data to be transmitted to the signal line DATA, the lens microcomputer 111 cancels the low output to the signal line DATA. The next communication is able to be start, when signal level of the signal line DATA changes back to high level, by the lens microcomputer 111 and the adapter microcomputer 302 canceling the low output to the signal line DATA when receiving the stop bit SP input from the signal line DATA.

FIG. 4B also illustrates signal waveforms in broadcast communication performed between the camera microcomputer 205, the lens microcomputer 111, and the adapter microcomputer 302. Here, an example where the lens microcomputer 111 notifies the camera microcomputer 205 of a start of broadcast communication will be described. In this example, the adapter microcomputer 302 performs broadcast communication to the camera microcomputer 205 and the lens microcomputer 111 in response to broadcast communication from the camera microcomputer 205 to the lens microcomputer 111 and the adapter microcomputer 302.

In 421, the lens microcomputer 111 initially starts a low output to the signal line CS to notify the camera microcomputer 205 and the adapter microcomputer 302 of a start of broadcast communication. In other words, the adapter microcomputer 302 notifies the communication request by change of the signal level of the signal line data. In 422, the camera microcomputer 205 detecting that the signal level of the signal line CS becomes low starts a low output to the signal line CS. Since the lens microcomputer 111 has already started the low output to the signal line CS, the signal level of the signal line CS does not change at this point in time.

In 423, the camera microcomputer 205 outputs, corresponding to the communication request notified via the signal line CS, data to be transmitted to the signal line DATA. In 424, the adapter microcomputer 302 starts a low output to the signal line CS at timing when the start bit ST input from the signal line DATA is detected. Since the camera microcomputer 205 has already started the low output to the signal line CS, the signal level of the signal line CS does not change at this point in time.

In 425, the camera microcomputer 205 finishes outputting up to the stop bit SP, and cancels the low output to the signal line CS. Meanwhile, the lens microcomputer 111 and the adapter microcomputer 302 receive up to the stop bit SP input from the signal line DATA, and then analyze the received data and perform internal processing associated with the received data. In 426 and 427, the lens microcomputer 111 and the adapter microcomputer 302 get ready to receive next data, and then cancel the low output to the signal line CS. As described above, the signal level of the signal line CS becomes high if the camera microcomputer 205, the lens microcomputer 111, and the adapter microcomputer 302 all cancel the low output to the signal line CS. The camera microcomputer 205, the lens microcomputer 111, and the adapter microcomputer 302 can thus each check that the signal level of the signal line CS becomes high after the cancellation of the low output to the signal line CS. By checking that the signal level of the signal line CS becomes high, the camera microcomputer 205, the lens microcomputer 111, and the adapter microcomputer 302 each can determine that the current communication processing is ended and the microcomputers are ready to perform next communication.

In 431, the adapter microcomputer 302 checks that the signal level of the signal line CS has returned to high, and starts a low output to the signal line CS to notify the camera microcomputer 205 and the lens microcomputer 111 of a start of broadcast communication. In other words, the adapter microcomputer 302 notifies the communication request by change of the signal level of the signal line data. In 432, the adapter microcomputer 302 outputs data to be transmitted to the data signal DATA. In 433 and 434, the camera microcomputer 205 and the lens microcomputer 111 start a low output to the signal line CS at timing when the start bit ST input from the signal line DATA is detected. Since the adapter microcomputer 302 has already started the low output to the signal line CS, the signal level of the signal line CS does not change at this point in time.

In 435, the adapter microcomputer 302 finishes outputting up to the stop bit SP, and cancels the low output to the signal line CS. Meanwhile, the camera microcomputer 205 and the lens microcomputer 111 receive up to the stop bit SP input from the signal line DATA, and then analyze the received data and perform internal processing associated with the received data. In 436 and 437, the camera microcomputer 205 and the lens microcomputer 111 get ready to receive next data, and then cancel the low output to the signal line CS.

In the example of FIG. 4B, the lens microcomputer 111 and the adapter microcomputer 302, which are communication slaves, start broadcast communication. At the point in time (421) when a low output to the signal line CS is started, the camera microcomputer 205, i.e., the communication master, is unable to determine which the signal line CS is set to low by, the lens microcomputer 111 or the adapter microcomputer 302. The camera microcomputer 205 therefore needs to communicate with both the lens microcomputer 111 and the adapter microcomputer 302 to check whether the microcomputers have started the broadcast communication (whether the microcomputers have made a communication request).

The lens microcomputer 111 or the adapter microcomputer 302 may output low to the signal line CS to start broadcast communication at timing when the camera microcomputer 205 outputs low to the signal line CS to start broadcast communication. In such a case, the camera microcomputer 205 is unable to detect that the lens microcomputer 111 or the adapter microcomputer 302 outputs low to the signal line CS. In this case, whether the communication request have been made or not cannot be distinguished. The camera microcomputer 205 can therefore be configured to issue a permission notification for permitting the lens microcomputer 111 and the adapter microcomputer 302, i.e., the communication slaves, to start broadcast communication. Therefore, the lens microcomputer 111 or the adapter microcomputer can notify the communication request by outputting low to the signal line CS again, if the camera microcomputer would not start communication even after elapse of predetermined time period.

As described above, the signal transmitted by the signal line CS in broadcast communication functions as a signal for indicating a start (execution) of broadcast communication and that the broadcast communication is in process.

While FIGS. 4A and 4B illustrate an example of broadcast communication, other broadcast communications can be performed. For example, data to be transmitted by a single broadcast communication may be one-byte data as illustrated in FIGS. 4A and 4B, or two- or three-byte data. The broadcast communication can be one-way communication from the camera microcomputer 205, which is the communication master, to the lens microcomputer 111 and the adapter microcomputer 302, which are communication slaves.

[P2P Communication]

Next, P2P communication performed between the camera main body 200 (camera microcomputer 205), the interchangeable lens 100 (lens microcomputer 111), and the adapter 300 (adapter microcomputer 302) will be described. The P2P communication is one-to-one communication (individual communication) in which the camera main body 200, which is the communication master, designates (selects) a partner (specific accessory apparatus) to communicate from between the interchangeable lens 100 and the adapter 300, which are communication slaves, and transmits and receives data to/from only the designated communication slave. The P2P communication is performed by using the signal line DATA and the signal line CS. A communication mode in which P2P communication is performed may be referred to as a P2P communication mode.

Figure 5:
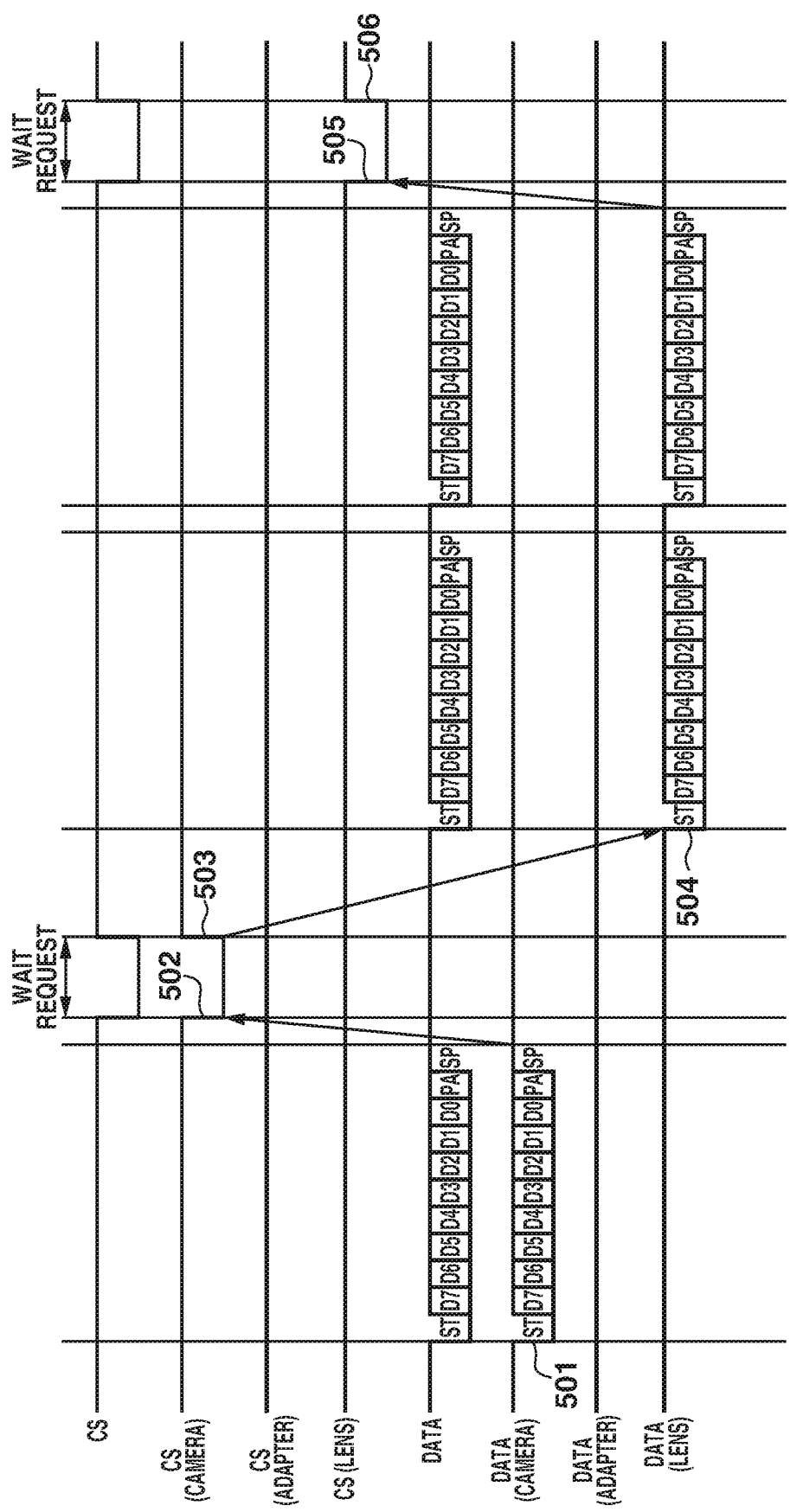
FIG. 5 is a diagram illustrating communication waveforms in peer-to-peer (P2P) communication according to one or more aspects of the present disclosure.

As an example, FIG. 5 illustrates the waveforms of signals of P2P communication to be exchanged between the camera microcomputer 205 and the lens microcomputer 111 which is designated as the communication partner. The lens microcomputer 11 transmits two bytes of data to the camera microcomputer 205 in response to transmission of one byte of data from the camera microcomputer 205. Processing for switching the communication modes (broadcast communication mode and P2P communication mode) and processing for designating the communication partner of P2P communication will be described below.

In 501, the camera microcomputer 205 which is the communication master initially outputs data to be transmitted to the signal line DATA. In 502, the camera microcomputer 205 finishes outputting up to the stop bit SP and then starts a low output to the signal line CS. In 503, the camera microcomputer 205 gets ready to receive next data, and then cancels the low output to the signal line CS. The lens microcomputer 111 detects the low signal input from the signal line CS, and then analyzes received data input from the signal line DATA and performs internal processing associated with the received data. In 504, the lens microcomputer 111 checks that the signal level of the signal line CS has returned to high, and then outputs two bytes of data to be transmitted to the signal line DATA in succession. In 505, the lens microcomputer 111 finishes outputting up to the stop bit SP of the second byte, and then starts a low output to the signal line CS. In 506, the lens microcomputer 111 gets ready to receive next data, and then cancels the low output to the signal line CS.

The adapter microcomputer 302, which is not designated as the communication partner of P2P communication, outputs no signal to the signal line CS or the signal line DATA.

As described above, the signal transmitted by the signal line CS in P2P communication functions as a notification signal for indicating an end of data transmission and a wait request for next data transmission.

While FIG. 5 illustrates an example of P2P communication, other P2P communications can be performed. For example, data can be transmitted through the signal line DATA byte by byte. Data can be transmitted in units of three bytes or more.

[Processing for Switching Communication Modes and Processing for Designating Communication Partner]

Next, the processing for switching the communication modes and the processing for designating the communication partner of P2P communication will be described with reference to FIG. 6. FIG. 6 illustrates the waveforms of signals to be exchanged between the camera microcomputer 205, the lens microcomputer 111, and the adapter microcomputer 302 during the switching of the communication modes and the designation of the communication partner. The communication partner of P2P communication is designated by broadcast communication. As an example, a case where the camera microcomputer 205 designates the adapter microcomputer 302 as the communication partner of P2P communication, and P2P communication of one-byte data from the camera microcomputer 205 and P2P communication of one-byte data from the adapter microcomputer 302 are performed will be described. Subsequently, the camera microcomputer 205 designates the lens microcomputer 111 as the communication partner of P2P communication, and P2P communication of two-byte data from the camera microcomputer 205 and P2P communication of three-byte data from the lens microcomputer 111 are performed.

In 601, the camera microcomputer 205 which is the communication master initially performs broadcast communication by the procedure described in FIG. 4A. Slave designation data for designating the partner to communicate with the camera microcomputer 205 in the next P2P communication is notified by this broadcast communication. Based on the slave designation data received by the broadcast communication, the lens microcomputer 111 and the adapter microcomputer 302 which are the communication slaves each determine whether the microcomputer itself is designated as the communication partner of P2P communication. In 602, the communication modes of the camera microcomputer 205 and the designated communication slave are switched from the broadcast communication mode to the P2P communication mode according to the determination result. Here, the adapter microcomputer 302 is designated as the communication partner. In 603, the camera microcomputer 205 and the adapter microcomputer 302 therefore perform transmission and reception of data therebetween in the next P2P communication according to the procedure described in FIG. 5. Here, the camera microcomputer 205 transmits one-byte data to the adapter microcomputer 302, and then the adapter microcomputer 302 transmits one-byte data to the camera microcomputer 205.

If the P2P communication between the camera microcomputer 205 and the adapter microcomputer 302 ends, the camera microcomputer 205 can designate again, by broadcast communication, a communication partner to communicate with by P2P communication. In 604, to designate the lens microcomputer 111 as the communication partner of the next P2P communication, the camera microcomputer 205 sets the lens microcomputer 111 as the slave designation data and performs broadcast communication by the procedure described in FIG. 4A. In 605, the adapter microcomputer 302 ends the P2P communication in response to the broadcast communication, and at the same time, the communication modes of the camera microcomputer 205 and the lens microcomputer 111 are switched to the P2P communication mode. If the broadcast communication is not performed here, the P2P communication between the camera microcomputer 205 and the adapter microcomputer 302 continues.

In the next P2P communication, the camera microcomputer 205 and the lens microcomputer 111 perform transmission and reception of data therebetween according to the procedure described in FIG. 5. In 606, the camera microcomputer 205 transmits two-byte data to the lens microcomputer 111, and then the lens microcomputer 111 transmits three-byte data to the camera microcomputer 205.

As described above, the communication partner of P2P communication can be designated by broadcast communication. The broadcast communication and the P2P communication can be switched at the same time.

[Communication Control Processing]

Figure 7A:
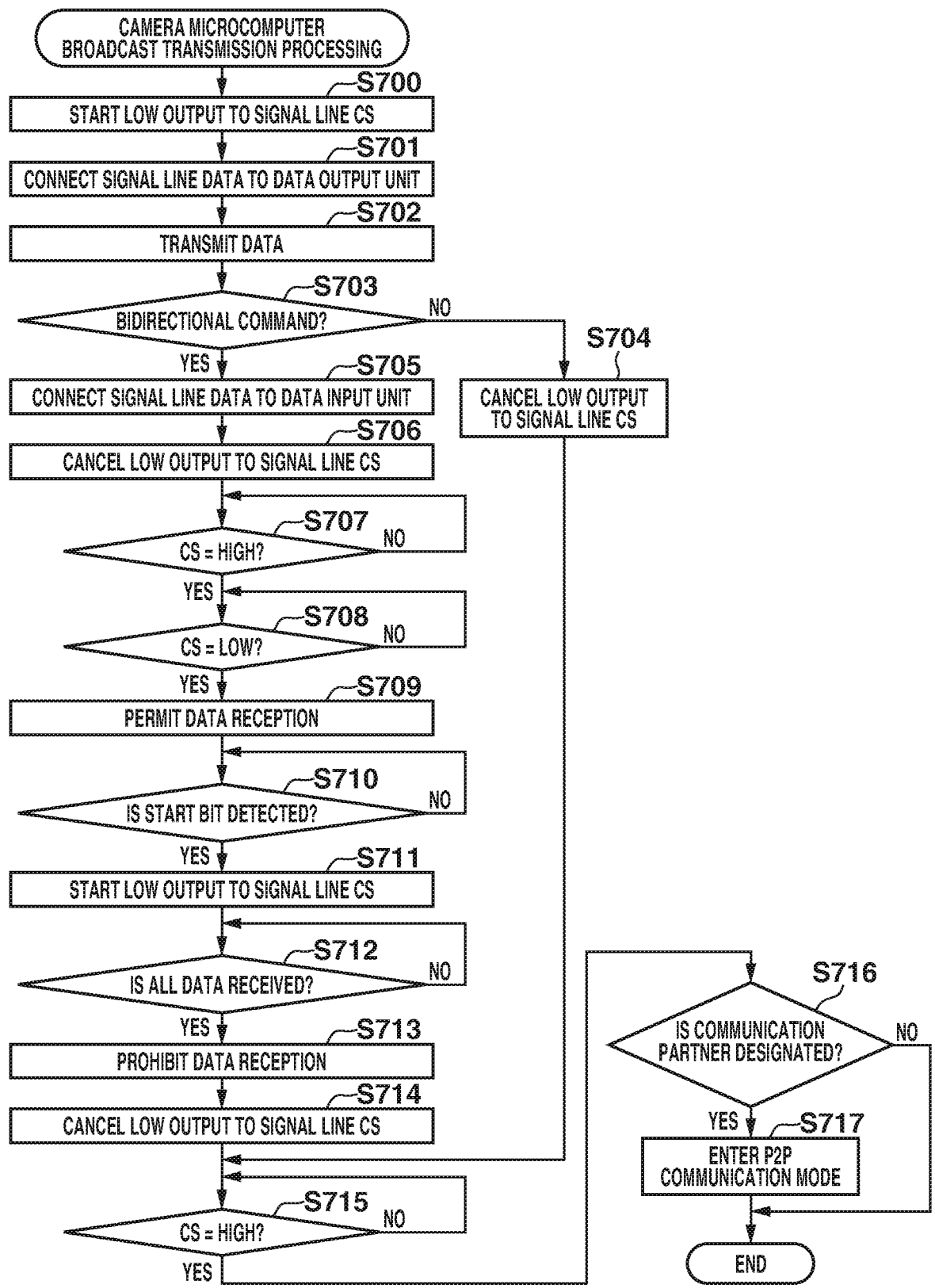
FIG. 7A is a flowchart illustrating processing of the camera main body in broadcast communication according to one or more aspects of the present disclosure.
Figure 7B:
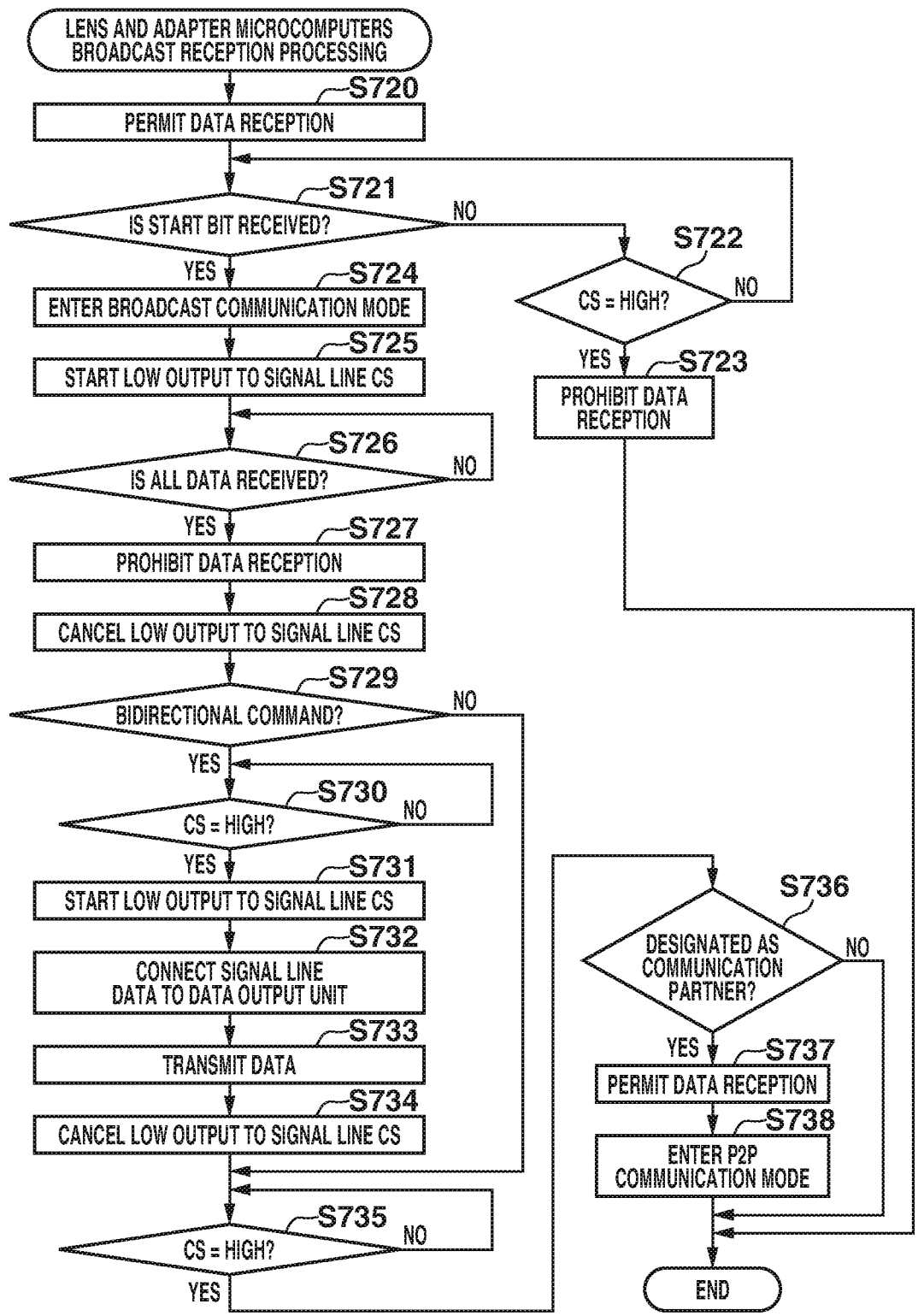
FIG. 7B is a flowchart illustrating processing of the interchangeable lens and the adapter in broadcast communication according to one or more aspects of the present disclosure.

Next, communication control processing performed between the camera microcomputer 205, the lens microcomputer 111, and the adapter microcomputer 302 will be described. Processing in the broadcast communication mode will initially be described with reference to the flowcharts of FIGS. 7A and 7B. FIG. 7A illustrates broadcast transmission processing performed by the camera microcomputer 205. FIG. 7B illustrates broadcast reception processing performed by the lens microcomputer 111 and the adapter microcomputer 302. As an example, processing in which the camera microcomputer 205 performs broadcast communication to the lens microcomputer 111 and the adapter microcomputer 302 is illustrated here. The camera microcomputer 205, the lens microcomputer 111, and the adapter microcomputer 302, which are a computer each, perform the present processing and other processing to be described below according to a communication control program serving as a computer program.

If an event to start broadcast communication occurs, then in step S700 of FIG. 7A, the camera microcomputer 205 turns on (connects) the ground switch 2081 to set the signal line CS to low. The lens microcomputer 11 and the adapter microcomputer 302 are thereby notified of a start of broadcast communication. An example of the event is that the camera microcomputer 205 requests data transmission of the lens microcomputer 111 or the adapter microcomputer 302. Another example of the event is that the lens microcomputer 111 or the adapter microcomputer 302 outputs low to the signal line CS to request a start of broadcast communication. Receiving the notification of a start of broadcast communication, the lens microcomputer 111 and the adapter microcomputer 302 start the broadcast reception processing described in FIG. 7B.

In step S701, the camera microcomputer 205 operates the input/output changeover switch 2082 to connect the signal line DATA to the data output unit. In step S702, the camera microcomputer 205 transmits data by using the signal line DATA. If the transmission of all the data is completed, the processing proceeds to step S703. The number of bytes of data to be transmitted and received here is not limited if the numbers of bytes recognized by the camera microcomputer 205, the lens microcomputer 111, and the adapter microcomputer 302 are the same.

In step S703, the camera microcomputer 205 determines whether the data transmitted in step S702 is a bidirectional command including transmission from the lens microcomputer 111 or the adapter microcomputer 302. In a case where the data is not a bidirectional command (NO in step S703), the processing proceeds to step S704. In a case where the data is a bidirectional command (YES in step S703), the processing proceeds to step S705.

In step S704, to indicate that the communication processing is ended, the camera microcomputer 205 cancels the low output to the signal line CS by turning off (disconnecting) the ground switch 2081. The processing proceeds to step S715.

In step S705, the camera microcomputer 205 connects the signal line DATA to the data input unit by operating the input/output changeover switch 2082. In step S706, to indicate that the communication processing is ended, the camera microcomputer 205 cancels the low output to the signal line CS by turning off (disconnecting) the ground switch 2081.

In step S707, the camera microcomputer 205 waits until the lens microcomputer 111 and the adapter microcomputer 302 complete data reception, i.e., until the signal line CS becomes high. In a case where the signal line CS is high (YES in step S707), the processing proceeds to step S708.

In step S708, the camera microcomputer 205 waits until data is transmitted from the lens microcomputer 111 or the adapter microcomputer 302. i.e., until the signal line CS becomes low. In a case where the signal line CS is low (YES in step S708), the processing proceeds to step S709.

In step S709, the camera microcomputer 205 permits data reception from the signal line DATA. In step S710, the camera microcomputer 205 waits until the start bit ST is detected on the signal line DATA. In a case where the start bit ST is detected (YES in step S710), the processing proceeds to step S711.

In step S711, to indicate that communication processing is underway, the camera microcomputer 205 starts a low output to the signal line CS by turning on (connecting) the ground switch 2081. In step S712, the camera microcomputer 205 waits until all the data is received. In a case where the reception of all the data is completed (YES in step S712), the processing proceeds to step S713. The number of bytes of data to be transmitted and received here is not limited, either, if the numbers of bytes recognized by the camera microcomputer 205, the lens microcomputer 111, and the adapter microcomputer 302 are the same.

In step S713, the camera microcomputer 205 prohibits data reception from the signal line DATA. In step S714, to indicate that the communication processing is ended, the camera microcomputer 205 cancels the low output to the signal line CS by turning off (disconnecting) the ground switch 2081. In step S715, the camera microcomputer 205 waits until the lens microcomputer 111 and the adapter microcomputer 302 complete data reception, i.e., until the signal line CS becomes high. In a case where the signal line CS is high (YES in step S715), the processing proceeds to step S716.

In step S716, the camera microcomputer 205 determines whether the lens microcomputer 111 or the adapter microcomputer 302 is designated as the communication partner of P2P communication by the data transmission of step S702. In a case where either one of the microcomputers is designated as the communication partner (YES in S716), the processing proceeds to step S717. If not (NO in step S716), the camera microcomputer 205 ends the broadcast transmission processing with the broadcast communication mode maintained.

In step S717, the camera microcomputer 205 enters the P2P communication mode and ends the broadcast transmission processing.

In FIG. 7B, if the signal line CS becomes a low level during communication standby in the broadcast communication mode or the P2P communication mode, the lens microcomputer 111 and the adapter microcomputer 302 recognize the low level as the notification of a start of broadcast communication. The lens microcomputer 111 and the adapter microcomputer 302 then start the broadcast reception processing.

In step S720, the lens microcomputer 111 and the adapter microcomputer 302 permit data reception from the signal line DATA. In step S721, the lens microcomputer 111 and the adapter microcomputer 302 determines whether the start bit ST is received from the signal line DATA. In a case where the start bit ST is not received (NO in step S721), the processing proceeds to step S722. In a case where the start bit ST is received (YES in step S721), the processing proceeds to step S724. Here, the lens microcomputer 111 and the adapter microcomputer 302 enter the broadcast communication mode if their own communication mode is the P2P communication mode.

In step S722, the lens microcomputer 111 and the adapter microcomputer 302 determine whether the signal line CS is high. In a case where the signal line CS is high (YES in step S722), the processing proceeds to S723 to end the broadcast reception processing. In a case where the signal line CS is not high (NO in step S722), the processing returns to step S721 to continue to wait for the reception of the start bit ST.

In step S723, the lens microcomputer 111 and the adapter microcomputer 302 prohibit data reception from the signal line DATA, and end the broadcast reception processing.

In step S724, the lens microcomputer 111 and the adapter microcomputer 302 enter the broadcast communication mode if their own communication mode is the P2P communication mode. In step S725, to indicate that the communication processing is underway, the lens microcomputer 111 and the adapter microcomputer 302 start a low output to the signal line CS by turning on (connecting) the ground switches 1121 and 3031.

In step S726, the lens microcomputer 111 and the adapter microcomputer 302 wait until all the data is received. In a case where the reception of all the data is completed (YES in step S726), the processing proceeds to step S727. The number of bytes of data to be received here is not limited, either, if the numbers of bytes recognized by the camera microcomputer 205, the lens microcomputer 111, and the adapter microcomputer 302 are the same.

In step S727, the lens microcomputer 111 and the adapter microcomputer 302 prohibit data reception from the signal line DATA. In step S728, to indicate that the communication processing is ended, the lens microcomputer 111 and the adapter microcomputer 302 cancel the low output to the signal line CS by turning off (disconnecting) the ground switch 1121 and 3031.

In step S729, the lens microcomputer 111 and the adapter microcomputer 302 each determine whether the data received in step S725 is a bidirectional command representing transmission from itself. In a case where the data is a bidirectional command representing transmission from itself (YES in step S729), the processing proceeds to step S730. In a case where the data is not a bidirectional command representing transmission from itself (NO in step S729), the processing proceeds to step S735.

In step S730, the lens microcomputer 111 and the adapter microcomputer 302 wait until the other microcomputer completes data reception, i.e., until the signal line CS becomes high. In a case where the signal line CS is high (YES in step S730), the processing proceeds to step S731.

In step S731, to issue notification of a start of broadcast communication, the lens microcomputer 111 and the adapter microcomputer 302 set the signal line CS to low by turning on (connecting) the ground switches 1121 and 3031. In step S732, the lens microcomputer 111 and the adapter microcomputer 302 connect the signal line DATA to their data output units by operating the input/output changeover switches 1122 and 3032.

In step S733, the lens microcomputer 111 and the adapter microcomputer 302 transmit data by using the signal line DATA. If the transmission of all the data ends, the processing proceeds to step S734. The number of bytes of data to be received here is not limited, either, if the numbers of bytes recognized by the camera microcomputer 205, the lens microcomputer 111, and the adapter microcomputer 302 are the same.

In step S734, to indicate that their own data transmission processing is ended, the lens microcomputer 111 and the adapter microcomputer 302 cancel the low output to the signal line CS by turning off (disconnecting) the ground switches 1121 and 3031.

In step S735, the lens microcomputer 111 and the adapter microcomputer 302 wait until the other microcomputers complete data reception, i.e., until the signal line CS becomes high. In a case where the signal line CS is high (YES in step S735), the processing proceeds to step S736.

In step S736, the lens microcomputer 111 and the adapter microcomputer 302 each determine whether the microcomputer is designated as the communication partner of P2P communication by the data received from the camera microcomputer 205 in step S726. In a case where the microcomputer is designated (YES in step S736), the processing proceeds to step S737. In a case where the microcomputer is not designated (NO in step S736), the lens microcomputer 111 and the adapter microcomputer 302 end the broadcast reception processing with the broadcast communication mode maintained.

In step S737, the lens microcomputer 111 and the adapter microcomputer 302 permit data reception from the signal line DATA. In step S738, the lens microcomputer 111 and the adapter microcomputer 302 enter the P2P communication mode and end the broadcast reception processing.

By the foregoing broadcast transmission and reception processing, data communication using broadcast communication from the camera microcomputer 205 to the lens microcomputer 111 and the adapter microcomputer 302 can be implemented.

Figure 8A:
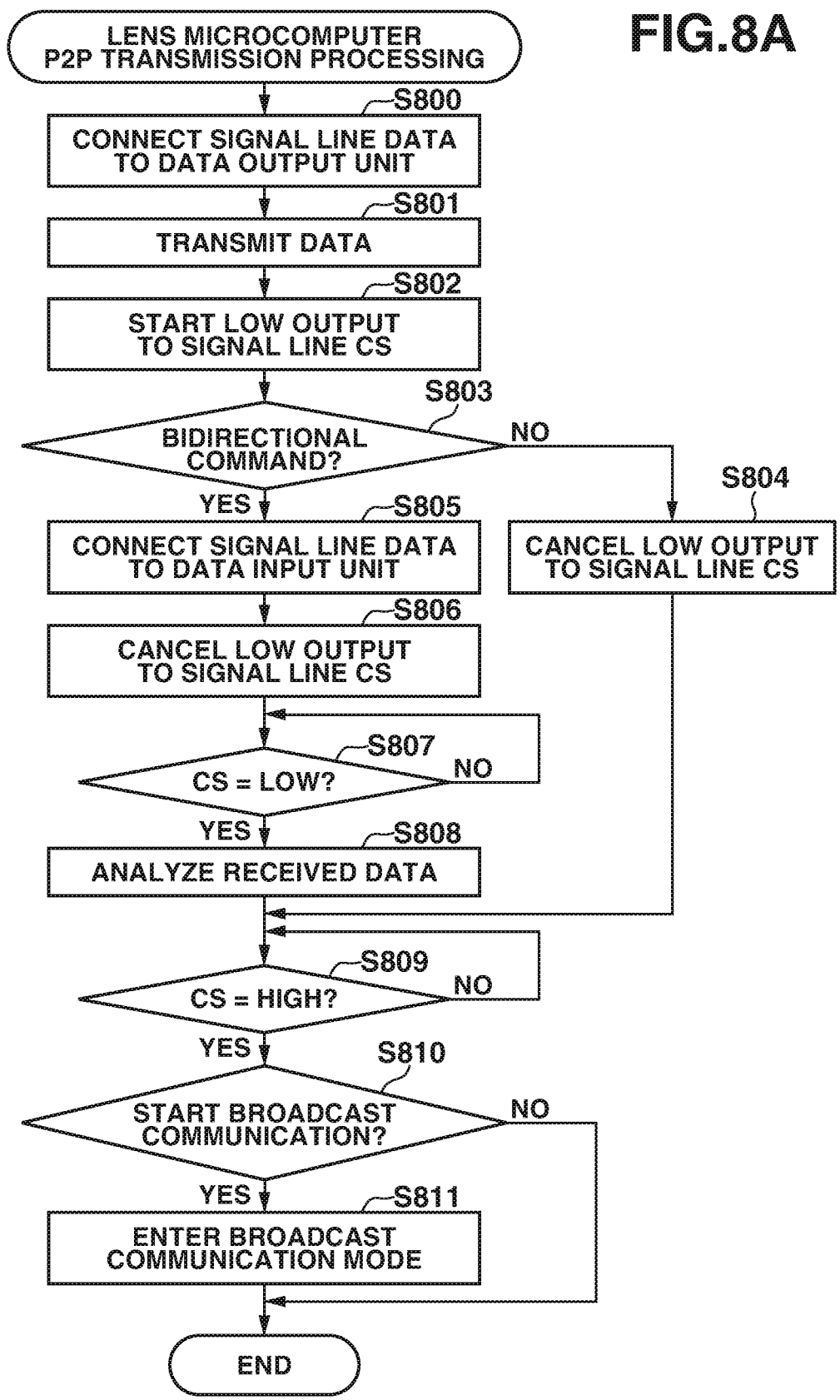
FIG. 8A is a flowchart illustrating processing of the camera main body in P2P communication according to one or more aspects of the present disclosure.
Figure 8B:
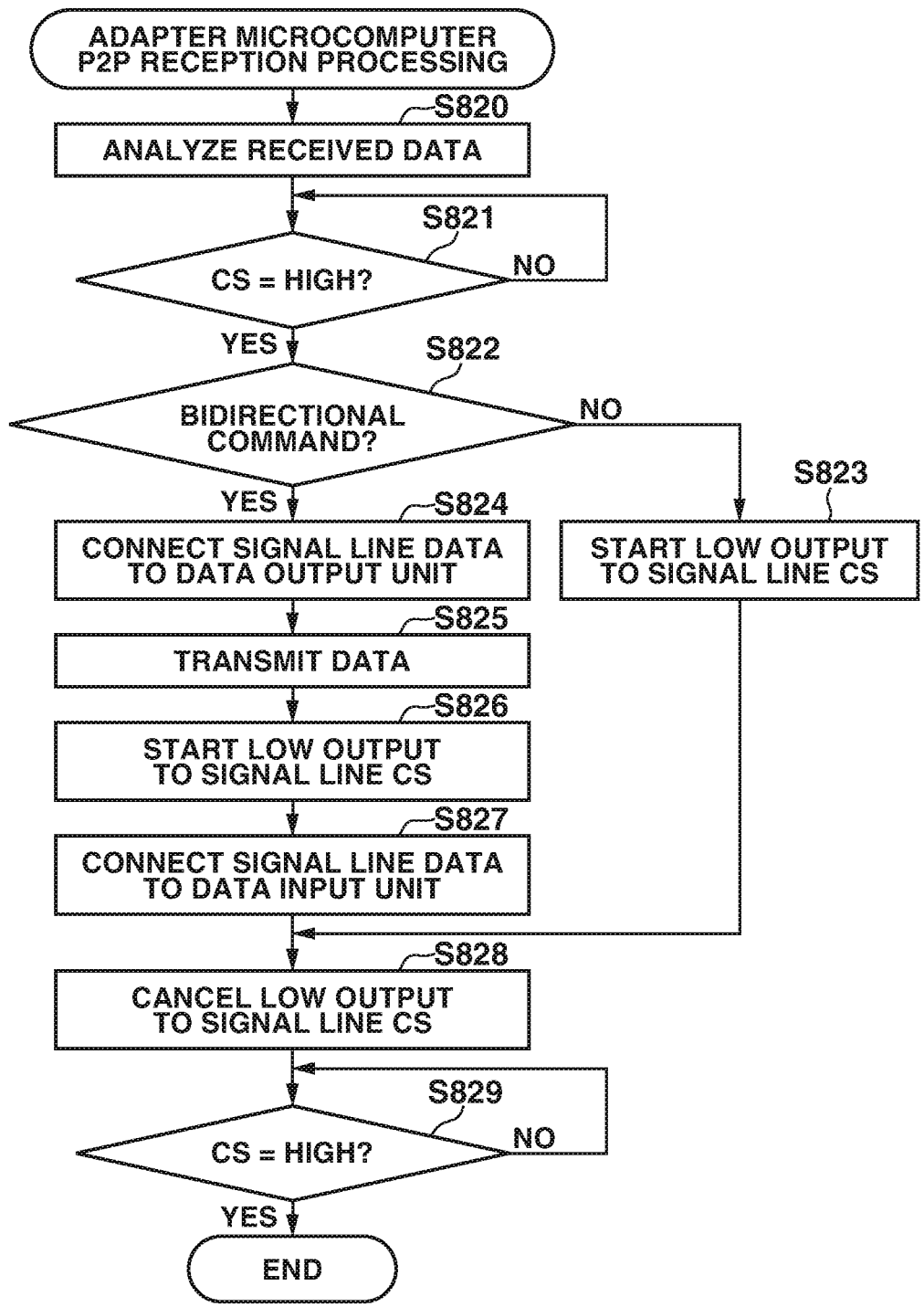
FIG. 8B is a flowchart illustrating processing of the interchangeable lens and the adapter in P2P communication according to one or more aspects of the present disclosure.

Next, processing in the P2P communication mode will be described with reference to the flowcharts of FIGS. 8A and 8B. FIG. 8A illustrates P2P transmission processing performed by the camera microcomputer 205. FIG. 8B illustrates an example of P2P reception processing which is performed by the adapter microcomputer 302 designated as the communication partner of P2P communication by the camera microcomputer 205. P2P reception processing similar to that of FIG. 8B is performed if the lens microcomputer 111 is designated as the communication partner of P2P communication.

If an event to start P2P communication occurs, then in step $800, the camera microcomputer 205 operates the input/output changeover switch 2082 to connect the signal line DATA to the data output unit. In step S801, the camera microcomputer 205 transmits data. If the transmission of all the data is completed, the processing proceeds to step S802. The number of bytes of data to be transmitted here is not limited if the numbers of bytes recognized by the camera microcomputer 205 and the adapter microcomputer 302 are the same.

In step S802, the camera microcomputer 205 starts a low output to the signal line CS by turning on (connecting) the ground switch 2081. The camera microcomputer 205 thereby notifies the adapter microcomputer 302 of the completion of the data transmission by P2P communication. Receiving the notification, the adapter microcomputer 302 starts the P2P reception processing described in FIG. 8B.

In step S803, the camera microcomputer 205 determines whether the data transmitted in step S802 is a bidirectional command including data transmission from the adapter microcomputer 302. In a case where the data is not a bidirectional command (NO in step S803), the processing proceeds to step S804. In a case where the data is a bidirectional command (YES in step S803), the processing proceeds to step S805.

In step S804, to detect that the adapter microcomputer 302 completes data reception, the camera microcomputer 205 cancels the low output to the signal line CS by turning off (disconnecting) the ground switch 2081. The processing proceeds to step S809.

In step S805, the camera microcomputer 205 connects the signal line DATA to the data input unit by operating the input/output changeover switch 2082. The processing proceeds to step S806.

In step S806, to detect that the data transmission from the adapter microcomputer 302 is completed, the camera microcomputer 205 cancels the low output to the signal line CS by turning off (disconnecting) the ground switch 2081. The processing proceeds to step S807.

In step S807, the camera microcomputer 205 waits until the data transmission from the adapter microcomputer 302 is completed, i.e., until the signal line CS becomes low. In a case where the signal line CS is low (YES in step S807), the camera microcomputer 205 determines that the data transmission from the adapter microcomputer 302 is completed, and the processing proceeds to step S808. The number of bytes of data to be received here is not limited, either, if the numbers of bytes recognized by the camera microcomputer 205 and the adapter microcomputer 302 are the same.

In step S808, the camera microcomputer 205 analyzes the data received from the signal line DATA. In step S809, the camera microcomputer 205 waits until the signal line CS becomes high. In a case where the signal line CS is high (YES in step S809), the camera microcomputer 205 determines that the current P2P communication is completed, and the processing proceeds to step S810.

In step S810, the camera microcomputer 205 determines whether to start broadcast communication at the next communication. In a case where broadcast communication is to be started (YES in step S810), the processing proceeds to step S811. In a case where P2P communication is to be continued (NO in step S810), the camera microcomputer 205 ends the P2P transmission processing with the P2P communication mode maintained.

In step S811, the camera microcomputer 205 enters the broadcast communication mode and ends the P2P transmission processing.

In step S820 of FIG. 8B, the adapter microcomputer 302 analyzes the data received from the signal line DATA. In step S821, the adapter microcomputer 302 waits until the signal line CS becomes high, i.e., until the processing of step S804 or S806 is completed. In a case where the signal line CS is high (YES in step S821), the processing proceeds to step S822.

In step S822, the adapter microcomputer 302 determines whether the received data analyzed in step S820 is a bidirectional command including data transmission from the adapter microcomputer 302. In a case where the data is not a bidirectional command (NO in step S822), the processing proceeds to step S823. In a case where the data is a bidirectional command (YES in step S822), the processing proceeds to step S824.

In step S823, to notify the camera microcomputer 205 of the completion of data reception, the adapter microcomputer 302 starts a low output to the signal line CS by turning on (connecting) the ground switch 3031. The processing then proceeds to step S828.

In step S824, the adapter microcomputer 302 connects the signal line DATA to the data output unit by operating the input/output changeover switch 3032. In step S825, the adapter microcomputer 302 transmits data by using the signal line DATA. If the transmission of all the data is completed, the processing proceeds to step S826. The number of bytes of data to be transmitted here is not limited if the numbers of bytes recognized by the camera microcomputer 205 and the adapter microcomputer 302 are the same.

In step S826, the adapter microcomputer 302 starts a low output to the signal line CS by turning on (connecting) the ground switch 3031. The adapter microcomputer 302 thereby notifies the camera microcomputer 205 of the completion of the data transmission by P2P communication.

In step S827, the adapter microcomputer 302 connects the signal line DATA to the data input unit by operating the input/output changeover switch 3032. The processing proceeds to step S828.

In step S828, to notify the camera microcomputer 205 of the completion of P2P communication, the adapter microcomputer 302 cancels the low output to the signal line CS by turning off (disconnecting) the ground switch 3031. In step S829, to detect that the camera microcomputer 205 completes P2P communication, the adapter microcomputer 302 waits until the signal line CS becomes high. In a case where the signal line CS is high (YES in step S829), the adapter microcomputer 302 ends the P2P reception processing.

By the processing described above, data transmission using P2P communication from the camera microcomputer 205, which is the communication master, to the adapter microcomputer 302, which is a communication slave, can be performed.

[Control According to Operation of Operation Member of Adapter]

Next, imaging communication processing (communication control method) performed between the camera microcomputer 205, the lens microcomputer 111, and the adapter microcomputer 302 to implement imaging control using the adapter operation ring 310 according to the present exemplary embodiment will be described with reference to FIG. 9. As an example, a case where the interchangeable lens 100 is connected to the camera main body 200 via one adapter 300 as illustrated in FIGS. 1 and 2 will be described. In such an example, the camera microcomputer 205, the lens microcomputer 111, and the adapter microcomputer 302 perform broadcast communication and P2P communication therebetween by using the signal line CS and the signal line DATA. The camera microcomputer 205 then receives operation state information to be described below about the adapter operation ring 310 from the adapter microcomputer 302, and controls the driving of the aperture unit 114 (hereinafter, referred to as aperture driving) in the interchangeable lens 110 via the lens microcomputer 111.

According to the operation of the adapter operation ring 310, the camera microcomputer 205 can control the driving of the magnification lens 102 and the focus lens 104 in the interchangeable lens 100, change a Tv value (exposure time) and an International Organization for Standardization (ISO) speed in the camera main body 200, or select a setting menu.

In 900, the adapter microcomputer 302 detects a rotation operation of the adapter operation ring 310 (hereinafter, referred to as a ring operation) by the user, and starts the present processing. If the adapter microcomputer 302 detects a start of the ring operation through a change in the output of the ring rotation detector 311 illustrated in FIG. 1, then in 901, the adapter microcomputer 302 starts sampling the operation state information about the adapter operation ring 310 (hereinafter, referred to as ring operation state information). Examples of the ring operation state information include an operation amount (rotation amount) including an operation direction (rotation direction) of the adapter operation ring 310, an accumulated value of the operation amount, an operation speed, and an operation acceleration. Any of these can be used as the ring operation state information. In the present exemplary embodiment, the accumulated value of the operation amount and the operation speed are sampled as the ring operation state information.

In 902, to notify the camera microcomputer 205 of a start of the ring operation, the adapter microcomputer 302 requests the camera microcomputer 205 to start broadcast communication by a low output (421) to the signal line CS illustrated in FIG. 4B before said notification. In other words, the adapter microcomputer 302 transmits a communication request to the camera microcomputer 205.

When receiving the communication request from the adapter microcomputer 302, the camera microcomputer 205 starts broadcast communication. At this point in time, the camera microcomputer 205 is unable to determine which the communication request is transmitted from, the lens microcomputer 111 or the adapter microcomputer 302. The factor (reason or event) of the communication request is not known, either. The camera microcomputer 205 therefore needs to inquire of each of the lens microcomputer 111 and the adapter microcomputer 302 about the factor of the communication request (hereinafter, referred to as a communication request factor). In the present exemplary embodiment, in 903, the camera microcomputer 205 initially designates the lens microcomputer 111 as the communication partner of P2P communication by using broadcast communication (604) illustrated in FIG. 6. The order of inquiries about the communication request factor can be the adapter microcomputer 302 first. If the lens microcomputer 111 is previously known to not output a communication request for broadcast communication, the camera microcomputer 205 does not need to inquire of the lens microcomputer 111 about the communication request factor.

In 904, the camera microcomputer 205 inquires of the lens microcomputer 111 about a communication request factor by using P2P communication of FIG. 5 via the signal line DATA, and receives the communication request factor from the lens microcomputer 111 via the signal line DATA. In this example, the lens microcomputer 111 transmits information indicating the absence of the communication request factor to the camera microcomputer 205 since the communication request is not output by the lens microcomputer 111. By the P2P communication, the camera microcomputer 205 checks that the communication request is not output by the lens microcomputer 111. In 905, the camera microcomputer 205 designates the adapter microcomputer 302 as the communication partner of P2P communication by using broadcast communication (601) illustrated in FIG. 6. In 906, the camera microcomputer 205 inquires of the adapter microcomputer 302 about a communication request factor by using P2P communication of FIG. 5 via the signal line DATA (transmits third data), and receives the communication request factor (fourth data) from the adapter microcomputer 302 via the signal line DATA. In this example, the communication request is output by the adapter microcomputer 302, and the adapter microcomputer 302 transmits information indicating that the communication request factor is a start of a ring operation (hereinafter, referred to as ring operation start information).

By the camera microcomputer 205 receiving ring operation start information from the adapter microcomputer 302, the camera microcomputer 205 can determine the following facts: the communication request factor is start of a ring operation and the communication request is transmitted by the adapter microcomputer 302 is determined.

When receiving the ring operation start information from the adapter microcomputer 302, the camera microcomputer 205 obtains the foregoing ring operation state information from the adapter microcomputer 302. For that purpose, in 907, the camera microcomputer 205 initially designates the adapter microcomputer 302 as the communication partner of P2P communication by using broadcast communication (601) illustrated in FIG. 6. This broadcast communication does not need to be performed if the communication mode of the adapter microcomputer 302 is the P2P communication mode. In 908, by using P2P communication, the camera microcomputer 205 requests the adapter microcomputer 302 to transmit the ring operation state information (first data) (i.e., transmission of second data) and receives the ring operation state information from the adapter microcomputer 302. To transmit next ring operation state information, the adapter microcomputer 302 resets the ring operation state information inside at the point in time when the ring operation state information is transmitted. For example, the adapter microcomputer 302 resets the accumulated value of the operation amount of the adapter operation ring 310 to zero.

Subsequently, the camera microcomputer 205 repeats the designation of the adapter microcomputer 302 by broadcast communication (601) and the reception of the ring operation state information from the adapter microcomputer 302 by P2P communication (908) at predetermined periods until ring operation end information to be described below is received. The camera microcomputer 205 can thereby obtain the latest ring operation state information at each predetermined period.

In 909, the camera microcomputer 205 receiving the ring operation state information transmits an aperture drive request to the lens microcomputer 111 based on the ring operation state information. Either of broadcast communication and P2P communication can be used for the aperture drive request. The aperture drive request can be sent from the camera second communication unit 242 of the camera microcomputer 205 and received by the lens second communication unit 142 of the lens microcomputer 111. In other words, communication between the camera microcomputer 205 and the lens microcomputer 111 regarding aperture drive and communication between the camera microcomputer 205 and the adapter microcomputer 302 regarding ring operation are each performed by different communication passes. This enables to rise real-timeness of data communication.

The camera microcomputer 205 transmits the aperture dive request to the lens microcomputer 111 each time when the ring operation state information is received. However, the transmission periods of the aperture drive request to the lens microcomputer 111 can be different from the reception periods of the ring operation state information. For example, the reception periods of the ring operation state information can be set to be shorter than the transmission periods of the aperture drive request to the lens microcomputer 111. If the reception periods of the ring operation state information are set to be long, the accumulated value of the operation amount may overflow depending on the duration of the reception periods. The transmission periods of the aperture drive request to the lens microcomputer 111 need to depend on the periods of AE control. The adapter microcomputer 302 and the camera microcomputer 205 both can perform more appropriate processing by controlling the transmission periods of the aperture drive request to the lens microcomputer 111 and the reception periods of the ring operation state information to respective appropriate periods as described above.

To implement favorable aperture driving with respect to the user operation on the adapter operation ring 310, smooth and non-intermittent, continuous aperture driving is desired for the sake of moving image quality, in addition to aperture driving in proportion to the operation amount (accumulated value) and the operation speed of the adapter operation ring 310. In the present exemplary embodiment, the camera microcomputer 205 transmits a target Av value (target aperture value) and an aperture drive speed to the lens microcomputer 111 as an aperture drive request. Based on the received target Av value and aperture drive speed, the lens microcomputer 111 updates the target Av value and the aperture drive speed retained as internal information while driving the aperture unit 114. The lens microcomputer 111 performs continuous aperture driving according to the updated target Av value and aperture drive speed. By repeating such an operation at constant periods, the lens microcomputer 111 can perform aperture driving without a stop. If aperture driving is stopped, intermittent changes in brightness can affect the image quality of a moving image. In contrast, if the aperture unit 114 is continuously driven, the brightness changes smoothly and a moving image of higher quality can be obtained. A stop of aperture driving and the time needed to resume aperture driving from a state in which the aperture driving is stopped can be reduced by continuously driving the aperture unit 114.

Suppose that the transmission period of the aperture drive request from the camera microcomputer 205 is T, and the accumulated value of the operation amount of the adapter operation ring 310 in a period between the previous transmission and the next transmission of the aperture drive request is Cnt. Suppose also that a coefficient α represents the amount of aperture driving for one Cnt, and Δt is a margin time for the lens microcomputer 111 to update the target Av value and the aperture drive speed while driving the aperture unit 114. The setting of the margin time Δt enables aperture driving without a stop even if the transmission of the aperture drive request is delayed due to reasons such as a high microcomputer load and a tight communication band. Here, the camera microcomputer 205 calculates the target Av value and the aperture drive speed by the following equations (1) and (2):

$$\text{Target Av value} = \text{previous target Av value} + (Cnt \times \alpha) \quad (1)$$

and $$\text{Aperture drive speed} = (Cnt \times \alpha)/(T + \Delta t). \quad (2)$$

The foregoing equations (1) and (2) are just examples, and the target Av value and the aperture drive speed can be calculated by using other calculation formulas. The camera microcomputer 205 can transmit information other than the target Av value or the aperture drive speed to the lens microcomputer 111 as the aperture drive request.

In 910, the adapter microcomputer 302 detects an end of the operation of the adapter operation ring 310 from that the output of the ring rotation detector 311 remains unchanged for more than a predetermined time, and stores ring operation end information indicating the end of the ring operation into the ring operation state information. The end of the ring operation can be detected by a method different from the foregoing one.

In 911, the camera microcomputer 205 receives the ring operation state information from the adapter microcomputer 302. The ring operation state information received here includes the ring operation end information. The camera microcomputer 205 ends the subsequent periodic acquisition of the ring operation state information based on the ring operation end information. In 912, the camera microcomputer 205 transmits the aperture drive request to the lens microcomputer 111 based on the accumulated value of the operation amount and the operation speed of the adapter operation ring 310, included in the ring operation state information last received, and then ends the periodic transmission of the aperture drive request.

Figure 11A:
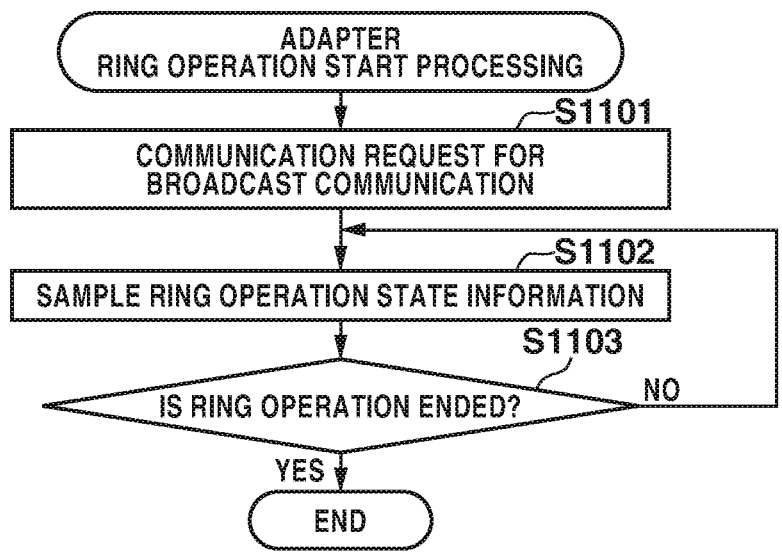
FIGS. 11A and 11B are flowcharts each illustrating processing of the adapter according to one or more aspects of the present disclosure.

Next, ring operation start processing performed by the adapter microcomputer 302 in the foregoing imaging communication processing will be described with reference to the flowchart of FIG. 11A. The adapter microcomputer 302 starts the present processing when a start of a ring operation is detected. In step S1101, to notify the camera microcomputer 205 of the start of the ring operation, the adapter microcomputer 302 sets the ring operation start information as a communication request factor into an internal transmission buffer. The adapter microcomputer 302 then transmits a communication request for broadcast communication to the camera microcomputer 205. The communication request factor (ring operation start information) set in the internal transmission buffer is transmitted to the camera microcomputer 205 by P2P communication to be described below.

In step S1102, the adapter microcomputer 302 samples the ring operation state information. In step S1103, the adapter microcomputer 302 determines whether the ring operation is ended. In a case where the ring operation is not ended (NO in step S1103), the processing returns to step S1102. In a case where the ring operation is ended (YES in step S1103), the adapter microcomputer 302 stores the ring operation end information into the ring operation state information in the internal transmission buffer, and ends the present processing.

Figure 11B:
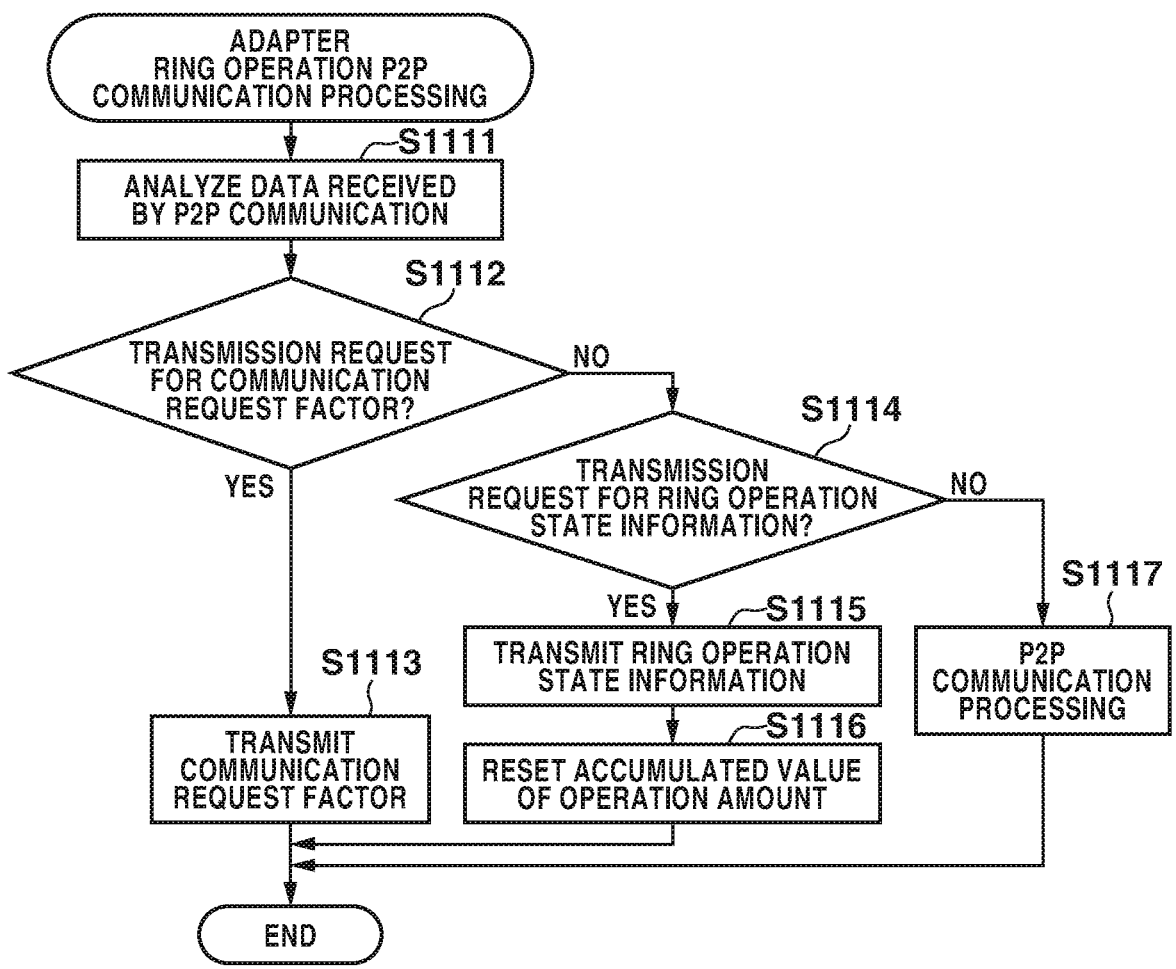

Ring operation P2P communication processing performed by the adapter microcomputer 302 in the foregoing imaging communication processing will be described with reference to the flowchart of FIG. 11B. The adapter microcomputer 302 starts the present processing when designated as the communication partner of P2P communication by the camera microcomputer 205.

In step S1111, the adapter microcomputer 302 analyzes data received from the camera microcomputer 205 by P2P communication. In step S1112, the adapter microcomputer 302 determines whether the data received from the camera microcomputer 205 is a transmission request for a communication request factor. If so (YES in step S1112), the processing proceeds to step S1113. If not (NO in step S1112), the processing proceeds to step S1114.

In step S113, the adapter microcomputer 302 transmits the communication request factor (ring operation start information) set in the internal transmission buffer in step S1101 to the camera microcomputer 205, and ends the present processing. The communication request factor in the internal transmission buffer is reset after the transmission.

In step S1114, the adapter microcomputer 302 determines whether the received data is a transmission request for ring operation state information (operation state transmission request). If so (YES in step S1114), the processing proceeds to step S1115. If not (NO in step S1114), the processing proceeds to step S1117.

In step S1115, the adapter microcomputer 302 transmits the ring operation state information sampled and set in the internal transfer buffer in step S1102 to the camera microcomputer 205. In step S1116, the adapter microcomputer 302 resets the accumulated value of the operation amount in the ring operation state information, and ends the present processing. The adapter microcomputer 302 can transmit the correct operation amount to the camera microcomputer 205 by resetting the accumulated value of the operation amount.

In step S1117, the adapter microcomputer 302 performs P2P communication processing other than the transmission of the communication request factor or the ring operation state information on the camera microcomputer 205, and ends the present processing. Examples of the P2P communication processing other than the transmission of the communication request factor or the ring operation state information include processing for transmitting information specific to the adapter 300, such as the presence or absence of an operation member on the adapter 300, a minimum period (minimum time interval) at which the ring operation state information can be transmitted, and the optical magnification of the adapter 300. A reception request from the camera microcomputer 205 may be included. For example, a request to start or stop the sampling of the ring operation state information can be included. In the present exemplary embodiment, the camera microcomputer 205 requests the minimum period at which the ring operation state information can be transmitted of the adapter microcomputer 302 and receives the minimum period from the adapter microcomputer 302 when the camera main body 200 is activated with the adapter 300 mounted.

Figure 12A:
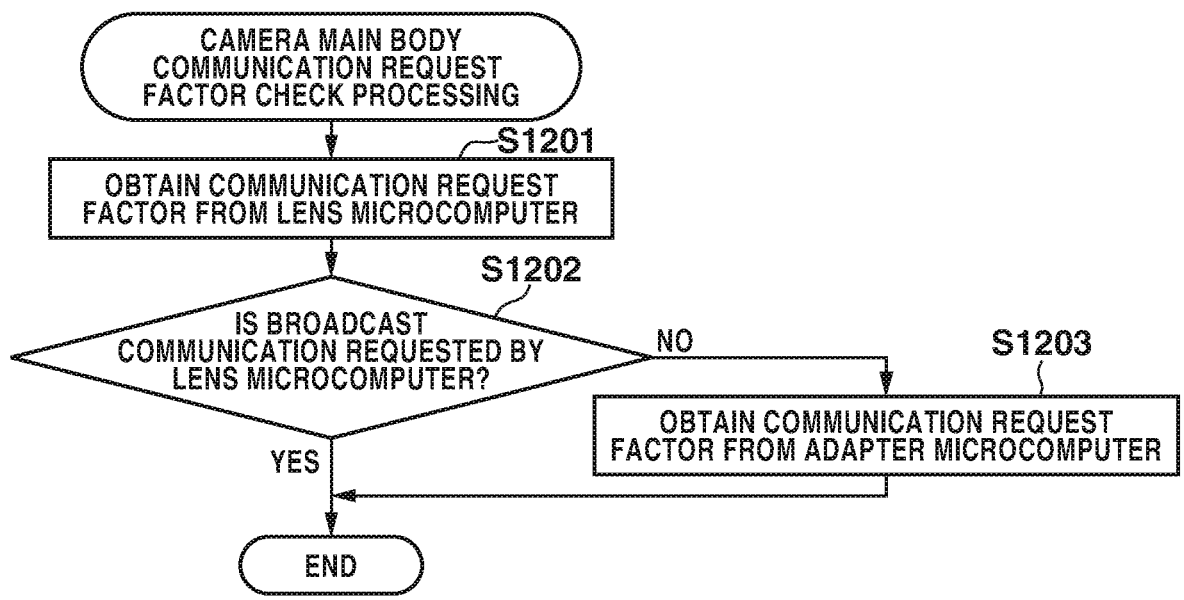
FIGS. 12A and 12B are flowcharts illustrating processing of the camera main body according to one or more aspects of the present disclosure.

Next, communication request factor check processing performed by the camera microcomputer 205 in the foregoing imaging communication processing will be described with reference to the flowchart of FIG. 12A. The communication request factor check processing is processing for checking the factor of the communication request output by either the lens microcomputer 111 or the adapter microcomputer 302.

In step S1201, the camera microcomputer 205 receiving the communication request transmits a transmission request for a communication request factor to the lens microcomputer 111 by P2P communication, and obtains the communication request factor from the lens microcomputer 111.

In step S1202, the camera microcomputer 205 analyzes the communication request factor obtained in step S1201, and determines whether the broadcast communication is requested by the lens microcomputer 111. In a case where the broadcast communication is requested by the lens microcomputer 111 (YES in step S1202), the camera microcomputer 205 ends the present processing procedure. In a case where the broadcast communication is not requested by the lens microcomputer 111 (NO in step S1202), the processing proceeds to step S1203.

In step S1203, the camera microcomputer 205 transmits a transmission request for a communication request factor to the adapter microcomputer 302 by P2P communication, obtains the communication request factor from the adapter microcomputer 302, and ends the present processing.

Figure 12B:
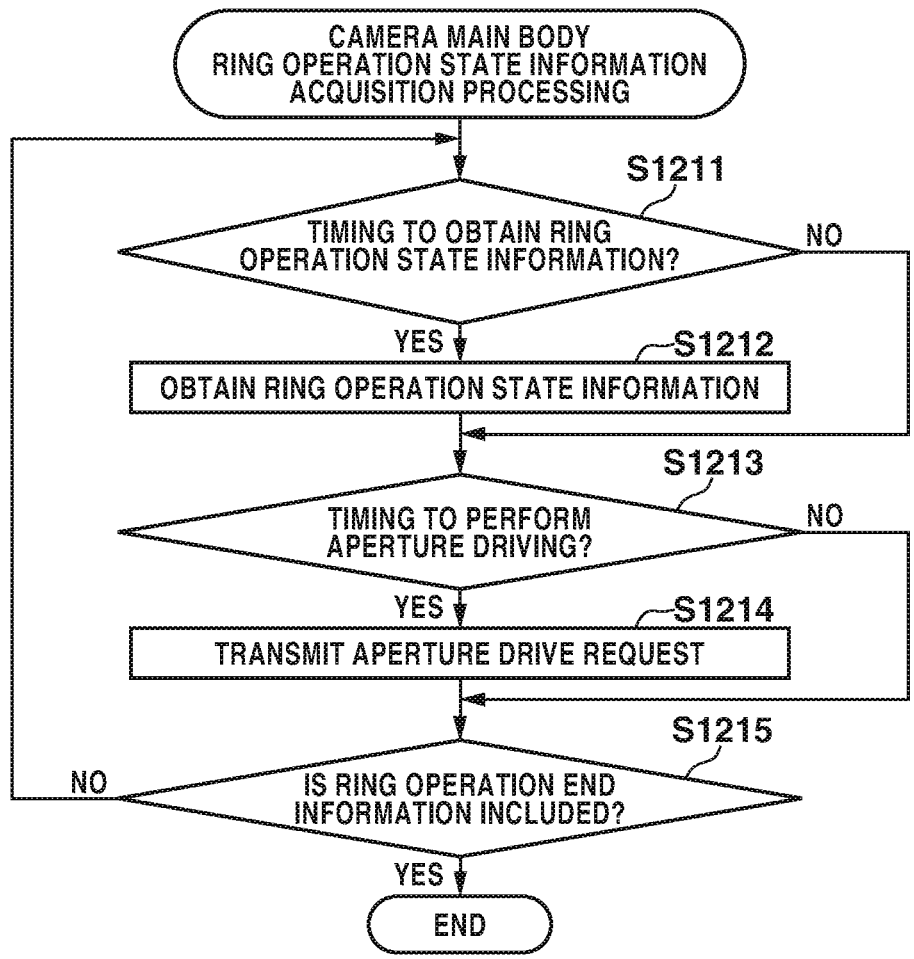

Ring operation state information acquisition processing performed by the camera microcomputer 205 in the foregoing imaging communication processing will be described with reference to the flowchart of FIG. 12B. In step S1211, the camera microcomputer 205 determines whether it currently is the timing to obtain the ring operation state information from the adapter microcomputer 302. In a case where the camera microcomputer 205 determines that it currently is the timing to obtain the ring operation state information from the adapter microcomputer 302 (YES in step S1211), the processing proceeds to step S1212. In a case where the camera microcomputer 205 determines it currently is not the timing to obtain the ring operation state information from the adapter microcomputer 302 (NO in step S1211), the processing proceeds to step S1213.

In step S1212, the camera microcomputer 205 transmits a transmission request for the ring operation state information (operation state transmission request) to the adapter microcomputer 305 by P2P communication, and obtains the ring operation state information from the adapter microcomputer 305.

In step S1213, the camera microcomputer 205 determines whether it is the timing to perform aperture driving. In a case where the camera microcomputer 205 determines that it is the timing to perform aperture driving (YES in step S1213), the processing proceeds to step S1214. In a case where the camera microcomputer 205 determines that it is not the timing to perform aperture driving (NO in step S1213), the processing proceeds to step S1215.

In step S1214, the camera microcomputer 205 transmits an aperture drive request to the lens microcomputer 111. The processing proceeds to step S1215.

In step S1215, the camera microcomputer 205 analyzes the ring operation state information obtained from the adapter microcomputer 302. In a case where the ring operation end information is included in the ring operation state information (YES in step S1215), the present processing ends. In a case where the ring operation end information is not included in the ring operation state information (NO in step S1215), the processing returns to step S1211.

Figure 13:
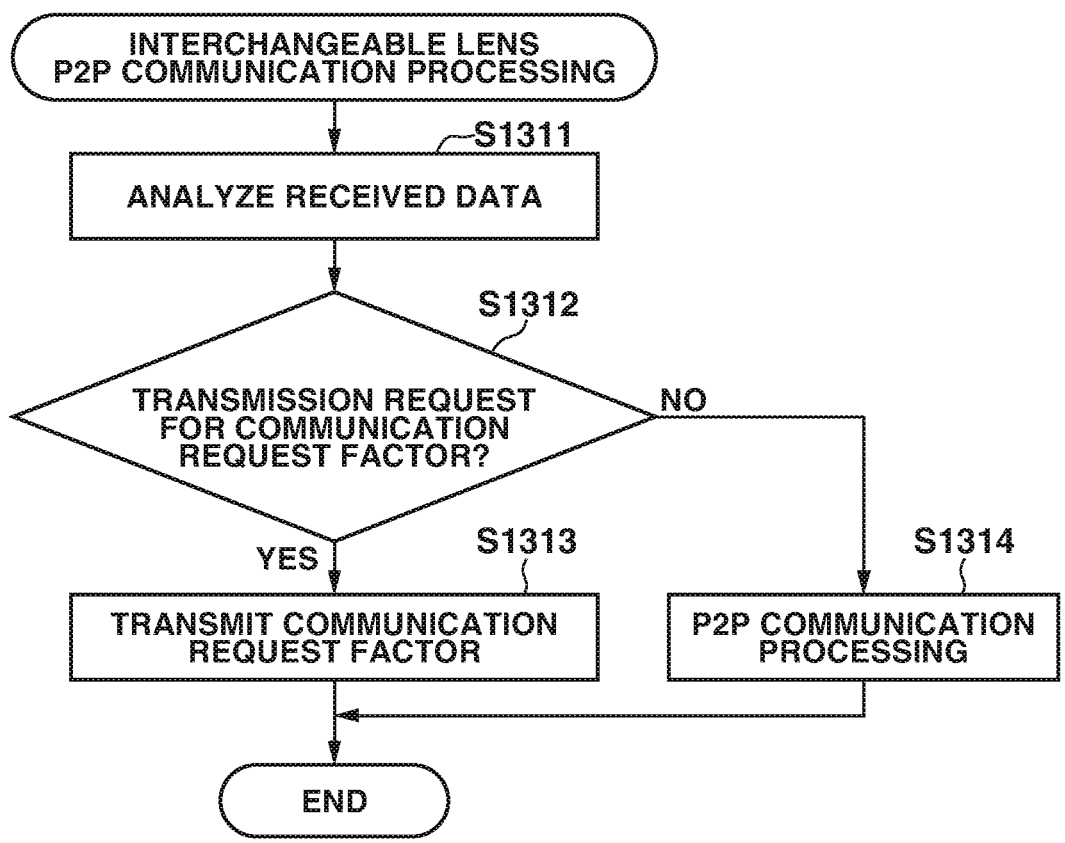
FIG. 13 is a flowchart illustrating processing of the interchangeable lens according to one or more aspects of the present disclosure.

Next, P2P communication processing performed by the lens microcomputer 111 in the foregoing imaging communication processing will be described with reference to the flowchart of FIG. 13. In step S1311, the lens microcomputer 111 designated as the communication partner of P2P communication by the camera microcomputer 205 analyzes the data received from the camera microcomputer 205.

In step S1312, the lens microcomputer 111 determines whether the received data is a transmission request for a communication request factor. In a case where the lens microcomputer 111 determines that the received data is a transmission request for a communication request factor (YES in step S1312), the processing proceeds to step S1313. In a case where the lens microcomputer 111 determines that the received data is not a transmission request for a communication request factor (NO in step S1312), the processing proceeds to step S1314.

In step S1313, the lens microcomputer 111 transmits the communication request factor set in the internal transmission buffer to the camera microcomputer 205, and ends the present processing procedure. The communication request factor set in the internal transmission buffer is reset after the transmission.

In step S1314, the lens microcomputer 111 performs P2P communication processing other than the transmission of the communication request factor on the camera microcomputer 205, and ends the present processing procedure. Examples of the P2P communication processing other than the transmission of the communication request factor include the transmission of specific information about the interchangeable lens 100, such as the presence or absence of an operation member on the interchangeable lens 100, operation state information about the operation member, a minimum period at which the operation state information can be transmitted, and a focal length and other optical information. A reception request from the camera microcomputer 205 can be included. For example, an aperture drive request and a focus lens drive request can be included.

According to the processing of the present exemplary embodiment, the camera microcomputer 205 does not need to periodically perform communication to notify the adapter microcomputer 302 whether a start of a ring operation can be detected. This can reduce communication and the processing of the camera microcomputer 205 when the user is not making a ring operation.

The adapter microcomputer 302 requests broadcast communication of the camera microcomputer 205 according to a ring operation by the user. Broadcast communication can thus be started with a time lag smaller than in a case where the camera microcomputer 205 performs communication to notify the adapter microcomputer 302 whether (a start and an end of) a ring operation can be detected and whether ring operation state information can be sampled. In other words, this enables highly real-time, favorable aperture driving corresponding to (in proportion to) the user operation on the adapter operation ring 310 provided on the adapter 300 which is connected between the camera main body 200 and the interchangeable lens 100.

Next, a second exemplary embodiment of the present disclosure will be described. A camera system according to the present exemplary embodiment has a similar configuration to that of the first exemplary embodiment. In the present exemplary embodiment, the camera main body 200, the interchangeable lens 100, and the adapter 300 share information indicating whether the interchangeable lens 100 and the adapter 300 include an operation member and information indicating a possible transmission period of operation state information about such operation members. For that purpose, in the present exemplary embodiment, either one of the interchangeable lens 100 and the adapter 300 that includes an adapter operation ring 310 serving as an operation member (here, the interchangeable lens 100 includes no operation member) is checked for a communication request factor first, and the possible transmission period of the information is made variable.

Figure 10:
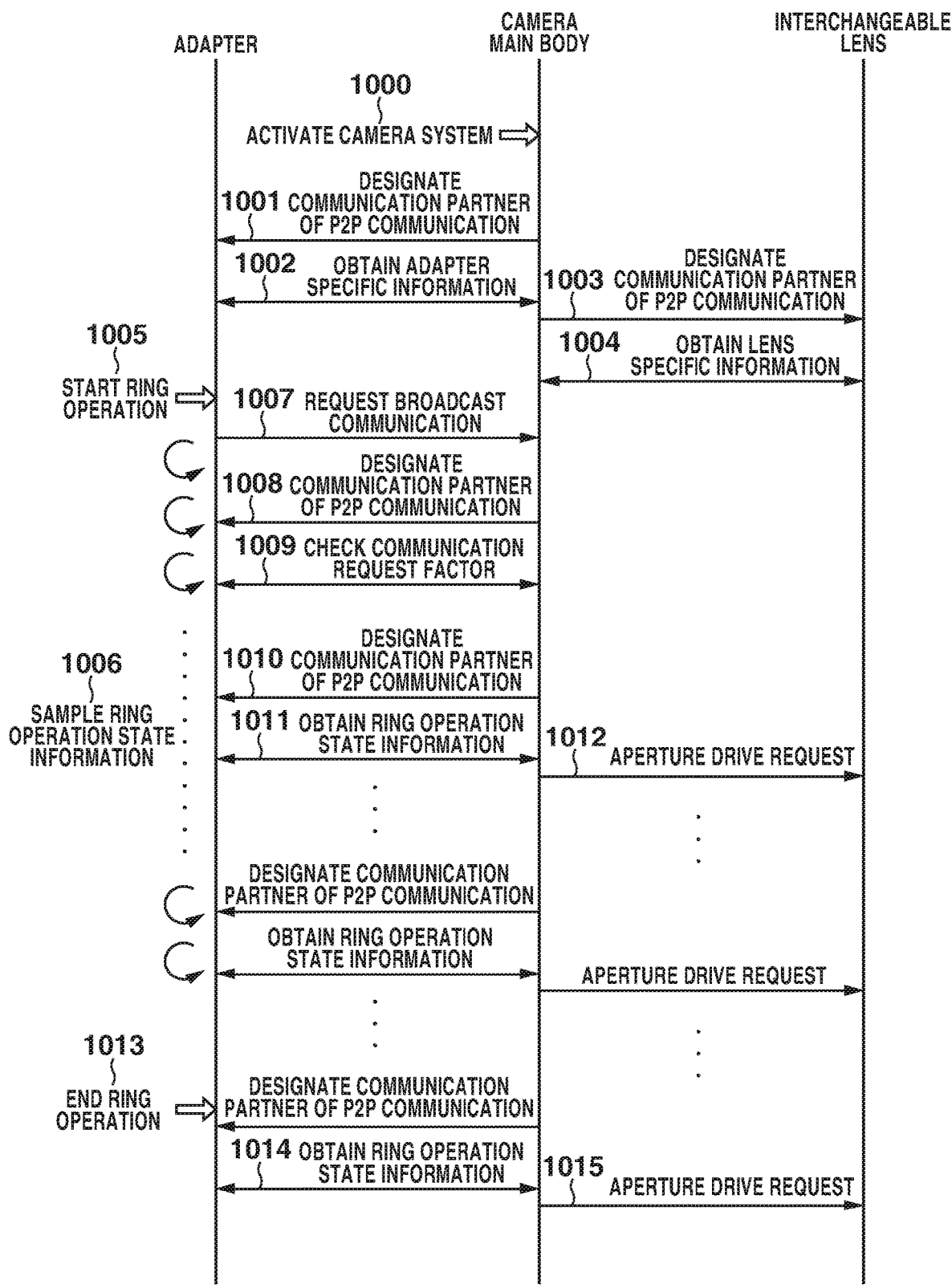
FIG. 10 is a diagram illustrating a control sequence according to the operation of the operation member of the adapter according to one or more aspects of the present disclosure.

FIG. 10 illustrates imaging communication processing performed between the camera microcomputer 205, the lens microcomputer 111, and the adapter microcomputer 302 to implement imaging control using the adapter operation ring 310 according to the present exemplary embodiment. Again, a case where the interchangeable lens 100 is connected to the camera main body 200 via one adapter 300 as illustrated in FIGS. 1 and 2 will be described as an example. In such an example, the camera microcomputer 205, the lens microcomputer 111, and the adapter microcomputer 302 perform broadcast communication and P2P communication therebetween by using the signal line CS and the signal line DATA. The camera microcomputer 205 receives ring operation state information to be described below from the adapter microcomputer 302. The camera microcomputer 205 controls driving of the aperture unit 114 (aperture driving) in the interchangeable lens 100 via the lens microcomputer 111.

In 1000, the camera system is initially activated to start the present processing. In 1001, to inquire of the adapter microcomputer 302 as to specific information about the adapter 300, the camera microcomputer 205 designates the adapter microcomputer 302 as the communication partner of P2P communication by using broadcast communication (601) illustrated in FIG. 6. The specific information about the adapter 300 (hereinafter, referred to as adapter specific information) includes whether an operation member such as the adapter operation ring 310 is included, and a possible transmission period of ring operation state information. The adapter specific information can include optical information about an optical magnification as an extender and information indicating the presence or absence of a magnification lens capable of driving.

In 1002, by using P2P communication, the camera microcomputer 205 requests the adapter microcomputer 302 to transmit the adapter specific information, and receives the adapter specific information from the adapter microcomputer 302. The camera microcomputer 205 can thereby check that the adapter 300 includes the adapter operation ring 310, and find out the possible transmission period of the ring operation state information (hereinafter, referred to as ring information possible transmission period).

In 1003, to inquire of the lens microcomputer 111 as to specific information about the interchangeable lens 100, the camera microcomputer 205 designates the lens microcomputer 111 as the communication partner of P2P communication by using broadcast communication (604) illustrated in FIG. 6.

In 1004, by using P2P communication, the camera microcomputer 205 requests the lens microcomputer 111 to transmit the specific information about the interchangeable lens 100 (hereinafter, referred to as lens specific information), and receives the lens specific information from the lens microcomputer 111. The camera microcomputer 205 can thereby check that the interchangeable lens 100 includes no operation member.

In 1005, the adapter microcomputer 302 detects a ring operation by the user. In 1006, the adapter microcomputer 302 starts sampling the ring operation state information. The ring operation state information is similar to that of the first exemplary embodiment.

In 1007, to notify (before notifying) the camera microcomputer 205 of a start of the ring operation, the adapter microcomputer 302 requests the camera microcomputer 205 to start broadcast communication by a low output (421) to the signal line CS illustrated in FIG. 4B. In other words, the adapter microcomputer 302 transmits a communication request to the camera microcomputer 205.

The camera microcomputer 205 receiving the communication request from the adapter microcomputer 302 has checked by the foregoing processing that the interchangeable lens 100 includes no operation member and the adapter 300 includes the adapter operation ring 310. The camera microcomputer 205 therefore inquires a communication request factor of the adapter microcomputer 302 first. The camera microcomputer 205 can thus detect a start of operation of the adapter operation ring 310 earlier. In 1008, the camera microcomputer 205 designates the adapter microcomputer 302 as the communication partner of P2P communication by using broadcast communication (601) illustrated in FIG. 6.

In 1009, by using the P2P communication of FIG. 5, the camera microcomputer 205 inquires of the adapter microcomputer 302 via the signal line DATA about the communication request factor. Then, the camera microcomputer 205 receives the communication request factor (ring operation start information) from the adapter microcomputer 302 via the signal line DATA. Since the communication request factor and the fact that the communication request is transmitted by the adapter microcomputer 302 are determined by above procession, the camera microcomputer 205 does not need to inquire of the lens microcomputer 111 about the communication request factor afterward.

In 1010, to obtain the ring operation state information from the adapter microcomputer 302, the camera microcomputer 205 designates the adapter microcomputer 302 as the communication partner of P2P communication by using broadcast communication (601) illustrated in FIG. 6. This broadcast communication does not need to be performed if the communication mode of the adapter microcomputer 302 is the P2P communication mode. In 1011, by using P2P communication, the camera microcomputer 205 requests the adapter microcomputer 302 to transmit the ring operation state information, and receives the ring operation state information from the adapter microcomputer 302. Like the first exemplary embodiment, to transmit next ring operation state information, the adapter microcomputer 302 resets the ring operation state information inside at the point in time when the ring operation state information is transmitted.

The camera microcomputer 205 sets a request period based on the ring information possible transmission period received from the adapter microcomputer 302 upon activation (1002). The camera microcomputer 205 subsequently repeats the designation (1010) of the adapter microcomputer 302 and the reception (1011) of the ring operation state information from the adapter microcomputer 302 at the request periods until ring operation end information is received. The camera microcomputer 205 can thereby obtain the latest ring operation state information at each request period.

The information about the ring information possible transmission period includes a minimum period and a maximum period at which the adapter microcomputer 302 can transmit the ring operation state information. The camera microcomputer 205 sets the request period within the range of the minimum and maximum periods. For example, if the operation amount and/or the operation speed of the adapter operation ring 310 is high, the request period is set to a shorter one to enable more sensitive imaging control (aperture control). On the other hand, if the operation amount and/or the operation speed is low, unnecessary communication can be suppressed by setting the request period to a longer one. The method for setting the request period is not limited thereto. In the present exemplary embodiment, the adapter microcomputer 302 transmits the ring information possible transmission period to the camera microcomputer 205. The ring operation state information can thus be obtained at appropriate request periods even if the adapter 300 is connected to the camera main body 200 for the first time (the adapter 300 is unknown to the camera microcomputer 205).

In 1012, the camera microcomputer 205 transmits an aperture drive request to the lens microcomputer 111 based on the obtained ring operation state information. As also described in the first exemplary embodiment, neither of broadcast communication and P2P communication can be used for the aperture drive request. The camera microcomputer 205 transmits the aperture drive request to the lens microcomputer 111 each time the ring operation state information is received. However, the transmission periods of the aperture drive request to the lens microcomputer 111 can be different from the reception periods of the ring operation state information.

The camera microcomputer 205, the adapter microcomputer 302, and the lens microcomputer 111 subsequently perform similar processing to that of the first exemplary embodiment, including the reception (1013) of the ring operation end information and the corresponding processing (1014 and 1015) by the camera microcomputer 205.

In the foregoing imaging communication processing, the camera microcomputer 205 obtains the ring information possible transmission period as the specific information about the adapter 300 in advance. The camera microcomputer 205 can thus request the adapter 300 to transmit the ring operation state information at appropriate request periods. This enables imaging control of even higher real-timeness corresponding to (in proportion to) the user operation on the adapter operation ring 310 provided on the adapter 300 which is connected between the camera main body 200 and the interchangeable lens 100.

According to the foregoing exemplary embodiments, one-to-many communication of the camera main body 200 with the interchangeable lens 100 and the adapter 300 is enabled to perform highly real-time, favorable imaging control using the adapter operation ring 310 provided on the adapter 300.

Next, a third exemplary embodiment of the present disclosure will be described. A camera system according to the present exemplary embodiment has a similar configuration to that of the first exemplary embodiment. In the present exemplary embodiment, the camera main body 200 allows or forbid the lens unit 100 and adapter 300 to perform broadcast communication.

Figure 14:
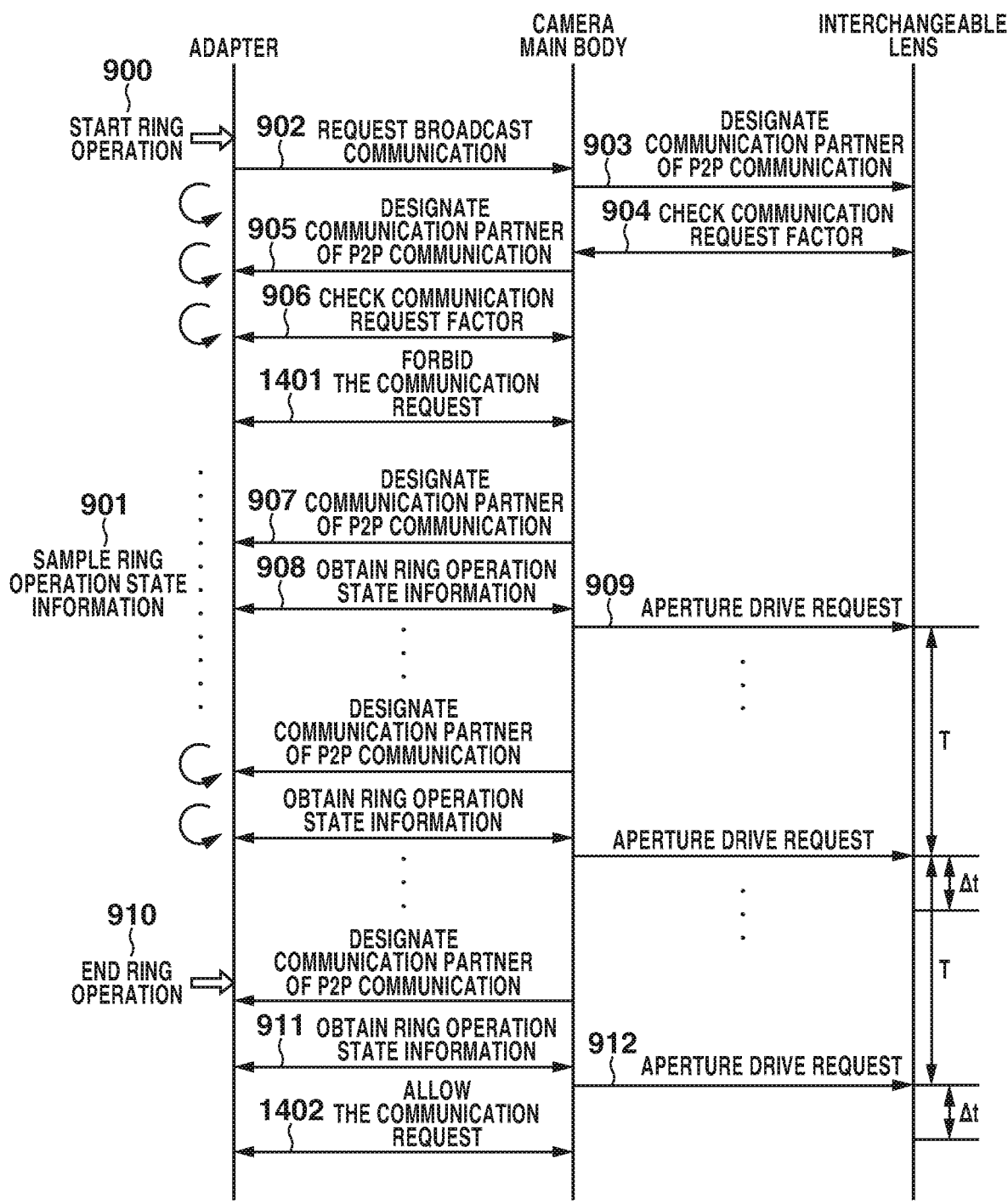
FIG. 14 is a diagram illustrating a control sequence according to an operation of an operation member of the adapter according to one or more aspects of the present disclosure.

FIG. 14 illustrates imaging communication processing performed between the camera microcomputer 205, the lens microcomputer 111, and the adapter microcomputer 302 to implement imaging control using the adapter operation ring 310 according to the present exemplary embodiment. Explanation regarding processing common with FIG. 10 is skipped.

In 906, after recognizing that transmission of the communication request is performed by the adapter microcomputer 302 and that the communication request factor is ring operation, the camera microcomputer 205 transmits forbidden information forbidding the communication request from adapter microcomputer 302 (1401).

In 911, after determination of the end of the ring operation, the camera microcomputer 205 transmits allowance information allowing the communication request from adapter microcomputer 302 (1402).

The processing of the present exemplary embodiment not only enables highly real-time, favorable imaging processing using the adapter operation ring 310 provided on the adapter 300 which is connected between the camera main body 200 and the interchangeable lens 100, but also enables preventing interruption by following communication request while the camera microcomputer 205 and the adapter microcomputer 303 are performing communication triggered by communication request transmitted from the adapter 300 beforehand, even when a different communication request factor has occurred to the adapter 300. This leads to reducing frequency of the communication and lighten the occupation of communication band.

Other Embodiments

In the foregoing first exemplary embodiment, the camera microcomputer 205 can perform communication to notify the adapter microcomputer 302 whether (a start and an end of) a ring operation can be detected and whether ring operation state information can be sampled. This can reduce unnecessary communication and the processing of the adapter microcomputer 302 in an imaging situation in which aperture driving is not needed. In such a case, the adapter microcomputer 302 can transmit only the operation amount in step S1115. The camera microcomputer 205 determines a start and an end of a ring operation based on the operation amount. For example, if the operation amount becomes greater than 0, the camera microcomputer 205 determines that a ring operation is started. For example, if the operation amount becomes greater than 0 and then returns to 0, the camera microcomputer 205 can determine that the ring operation is ended. If an operation amount of 0 is detected a predetermined number of times or more, after detection of start of the ring operation, the camera microcomputer 205 can determines that the ring operation is ended.

In the foregoing exemplary embodiments, information indicating whether the ring operation is ended can be transmitted along with the information about the operation state of the manual operation ring 130 (for example, operation amount). In such a case, for example, if the ring operation is not ended, information indicating that the ring operation is not ended is transmitted along with the operation amount of the manual operation ring 130.

In the foregoing exemplary embodiments, the processing to be performed on the adapter 300 has been described. If accessories other than the adapter 300 (including the interchangeable lens 100) include an operation ring, similar effects to those of the foregoing exemplary embodiments can be obtained by performing similar processing.

Figure 9:
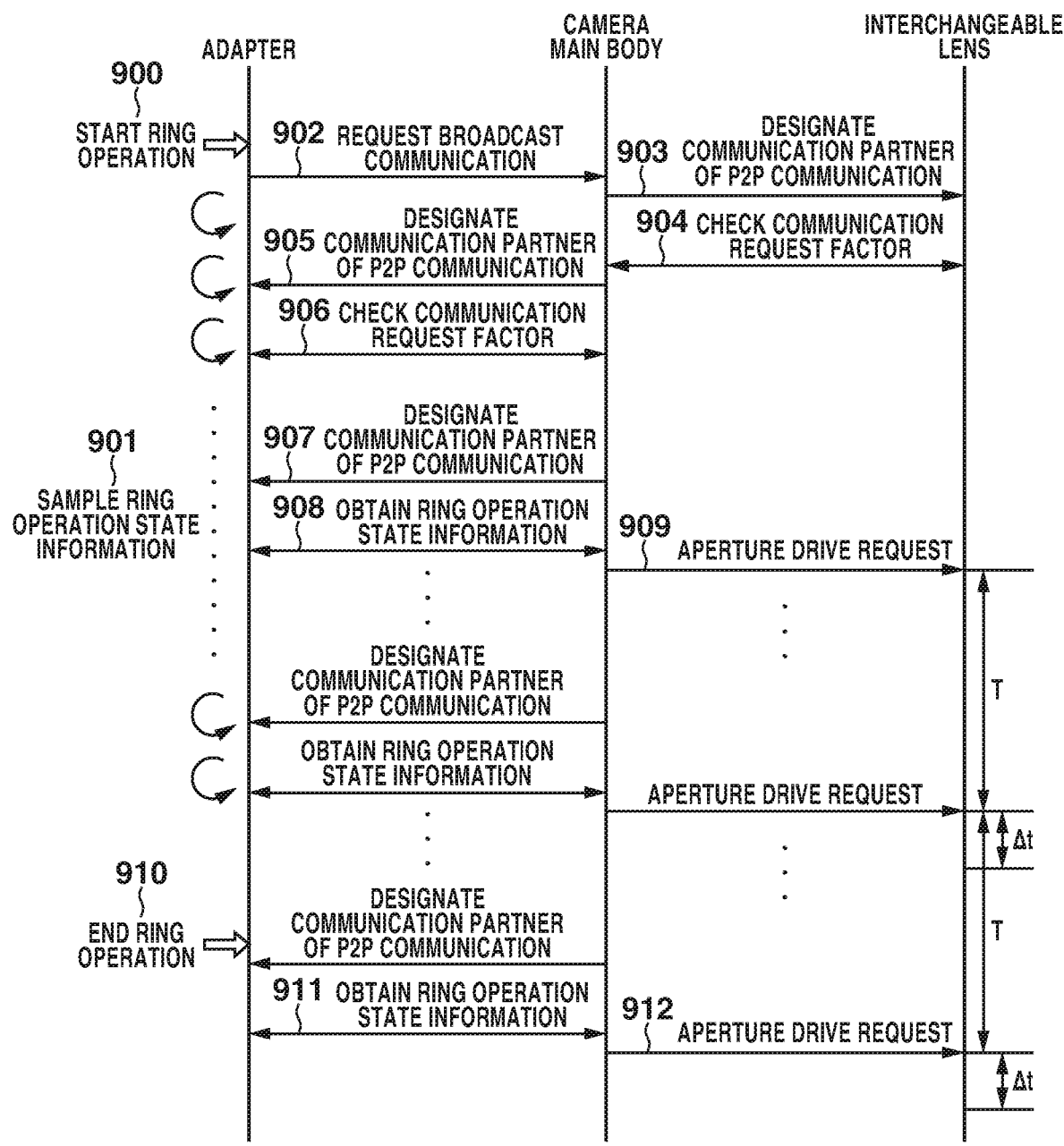
FIG. 9 is a diagram illustrating a control sequence according to an operation of an operation member of the adapter according to one or more aspects of the present disclosure.

In the foregoing exemplary embodiments, the processing of FIGS. 9 and 10 is described to be performed via the first communication units of the camera main body 200, the interchangeable lens 100, and the adapter 300. However, the camera system can be configured to not use the communication via the lens first communication unit 112 and the adapter first communication unit 303. In such a case, for example, 903 and 904 of FIGS. 9 and 1003 and 1004 of FIG. 10 can be omitted. Aperture drive requests to be transmitted from the camera microcomputer 205 to the lens microcomputer 111 are transmitted by communication via a camera second communication unit 242 and a lens second communication unit 142. In other words, the communication via the first communication units is used for the camera 200 and the adapter 300 to communicate, and the communication via the second communication units is used for the camera 200 and the interchangeable lens 100 to communicate. The camera system can be configured to not include a channel for performing communication via the lens first communication unit 112 and the adapter first communication unit 303 in the first place. In such a case, only P2P communication can be performed in FIGS. 9 and 10 without broadcast communication.

The exemplary embodiments described above are just typical examples, and various changes and modifications can be made to the exemplary embodiments in practicing the present disclosure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application Nos. 2017-107961, filed on May 31, 2017, and 2018-096870, filed on May 21, 2018 which are hereby incorporated by reference herein in their entirety.

What is claimed is:

1. An accessory apparatus connectable to an imaging apparatus, the accessory apparatus comprising:
   an operation member configured to allow an operation by a user;
   a first communication line configured to communicate with the imaging apparatus and a second communication line, which is different from the first communication line, configured to communicate with the imaging apparatus; and
   a communication control unit configured,
   in response to detection of the operation on the operation member, to change a signal level of the second communication line from a first signal level to a second signal level different from the first signal level
   to perform control to transmit first data in response to reception of second data via the first communication line that is transmitted via the first communication line in response to the change of the signal level of the second communication line to the second signal level, and to transmit third data, in response to reception of fourth data via the first communication line wherein the communication control unit transmits the third data after transmitting the first data, and receives the fourth data after receiving the second data, wherein the third data changes according to an operation amount of the operation member, while the first data does not change regardless of the operation amount, and wherein at least one processor or circuit is configured to perform a function of at least one of the units.

2. The accessory apparatus according to claim 1, wherein the communication control unit is configured to detect an end of the operation based on the third data.

3. The accessory apparatus according to claim 1, wherein the communication control unit is configured to receive information indicating an end of the operation from the imaging apparatus, and detect the end of the operation based on the information.

4. The accessory apparatus according to claim 1,
wherein the third data is an accumulated value of the operation amount, and
wherein the communication control unit is configured to accumulate the operation amount until reception of the fourth data, and transmit the accumulated value as the third data to the imaging apparatus in response to reception of the fourth data.

5. The accessory apparatus according to claim 4, wherein, after transmitting the accumulated value as the third data, the communication control unit is configured to reset the accumulated value.

6. The accessory apparatus according to claim 1, wherein the third data is an operation speed or operation acceleration of the operation member.

7. The accessory apparatus according to claim 1, wherein the communication control unit is configured to transmit, to the imaging apparatus, information indicating that the accessory apparatus includes the operation member.

8. The accessory apparatus according to claim 1, wherein the communication control unit is configured to transmit, to the imaging apparatus, information about a time interval at which the third data is allowed to be transmitted to the imaging apparatus.

9. The accessory apparatus according to claim 1, wherein the accessory apparatus is an accessory apparatus connectable to the imaging apparatus along with an interchangeable lens apparatus.

10. The accessory apparatus according to claim 1, wherein the communication control unit is also provided with a communication channel between the interchangeable lens apparatus and the communication control unit.

11. The accessory apparatus according to claim 1, wherein the third data indicates the operation amount of the operation member.

12. The accessory apparatus according to claim 1, wherein the first data indicates that the operation member had been operated.

13. The accessory apparatus according to claim 1, wherein the first signal level is higher than the second signal level.

14. The accessory apparatus according to claim 13, wherein the communication control unit is configured to communicate data via the first communication line, and to communicate a signal for communication control via the second communication line.

15. The accessory apparatus according to claim 14, wherein the communication control unit configured to transmit the first data and the third data while keeping the signal level of the second communication line at the first signal level, and to change the signal level of the second communication line from the first signal level to the second signal level after transmission of the first data and the third data.

16. An imaging apparatus to which an accessory apparatus including an operation member allowing an operation by a user is connectable along with an interchangeable lens apparatus, the imaging apparatus comprising:
a first communication line configured to communicate with the accessary apparatus and a second communication line, which is different from the first communication line, configured to communicate with the accessary apparatus; and
a communication control unit configured,
in response to a change in a signal level of the second communication line from a first signal level to a second signal level different from the first signal level, to transmit second data via the first communication line,
in response to the transmission of the second data via the first communication line, to receive first data via the first communication line, and
to receive third data in response to transmission of fourth data via the first communication line,
wherein the communication control unit receives the third data after receiving the first data, and transmits the fourth data after transmitting the second data,
wherein the third data changes according to an operation amount of the operation member, while the first data does not change regardless of the operation amount, and
wherein at least one processor or circuit is configured to perform a function of at least one of the units.

17. The imaging apparatus according to claim 16, wherein the communication control unit is configured to receive the third data from the accessory apparatus by transmitting the fourth data to the accessory apparatus.

18. The imaging apparatus according to claim 16, wherein the communication control unit is configured to transmit the fourth data to the accessory apparatus based on a first period.

19. The imaging apparatus according to claim 16, wherein the communication control unit is configured to receive information about a time interval at which the third data is allowed to be transmitted from the accessory apparatus, and transmit the fourth data to the accessory apparatus at the first period based on the time interval.

20. The imaging apparatus according to claim 16,
wherein the accessory apparatus is an intermediate accessory apparatus connectable between the imaging apparatus and the interchangeable lens apparatus,
wherein the accessory apparatus comprises a third communication line different from the first communication line and the second communication line, the third communication line being provided between the imaging apparatus and the interchangeable lens apparatus, and
wherein the communication control unit is configured to transmit control information to the interchangeable lens apparatus via the third communication line based on a second period, the control information being intended to control operation of the interchangeable lens apparatus based on the third data.

21. The imaging apparatus according to claim 20, wherein the first period is shorter than the second period.

22. The imaging apparatus according to claim 16, wherein, in a case where the communication control unit receives the communication request from the accessory apparatus, the communication control unit is configured to transmit the second data to the accessory apparatus.

23. The imaging apparatus according to claim 16, wherein, in a case where information indicating that the accessory apparatus includes the operation member is received, the communication control unit is configured to transmit the fourth data to the accessory apparatus.

24. The imaging apparatus according to claim 16, wherein the operation state is information corresponding to driving of an aperture of the interchangeable lens apparatus.

25. The imaging apparatus according to claim 16, wherein the third data indicates the operation amount of the operation member.

26. The imaging apparatus according to claim 16, wherein the first data indicates that the operation member had been operated.

27. The imaging apparatus according to claim 16, wherein the first signal level is higher than the second signal level.

28. The imaging apparatus according to claim 27, wherein the communication control unit is configured to communicate data via the first communication line, and to communicate a signal for communication control via the second communication line.

29. The imaging apparatus according to claim 28, wherein the communication control unit configured to receive the first data and the third data while keeping the signal level of the second communication line at the first signal level.

30. A control method of an accessory apparatus mountable on an imaging apparatus, the accessory apparatus including an operation member allowing an operation by a user, a first communication line for performing communication with the imaging apparatus, and a second communication line, different from the first communication line, configured to perform communication with the imaging apparatus, the control method comprising:

changing, in response to detecting the operation on the operation member, a signal level of the second communication line from a first signal level to a second signal level different from the first signal level, performing control to transmit first data in response to reception of second data via the first communication line that is transmitted via the first communication line in response to the change of the signal level of the second communication line to the second signal level, and transmitting third data in response to receiving fourth data via the first communication line, wherein the third data is transmitted after transmitting the first data, and the fourth data is received after receiving the second data, and wherein the third data changes according to an operation amount of the operation member, while the first data does not change regardless of the operation amount.

31. A control method of an imaging apparatus to which an accessary apparatus is connectable along with an interchangeable lens apparatus, the accessary apparatus including an operation member allowing an operation by a user, the imaging apparatus including a first communication line for performing communication with the accessary apparatus and a second communication line, different from the first communication line, for performing communication with the accessary apparatus, the control method comprising:

transmitting, in response to a change in a signal level of the second communication line from a first signal level to a second signal level different from the first signal level, second data via the first communication line, receiving, in response to the transmission of the second data via the first communication line, first data via the first communication line, and receiving third data in response to transmission of fourth data via the first communication line, wherein the communication control unit receives the third data after receiving the first data, and transmits the fourth data after transmitting the second data, and wherein the third data changes according to an operation amount of the operation member, while the first data does not change regardless of the operation amount.

* * * * *